US009335032B2

(12) United States Patent
Holder et al.

(10) Patent No.: US 9,335,032 B2
(45) Date of Patent: May 10, 2016

(54) INSULATED RECESSED LIGHT CAN COVER

(75) Inventors: Casey Holder, Eustis, FL (US); Daniel W. Hawkins, Lake Mary, FL (US)

(73) Assignee: Thermastop, LLC, Tavares, FL (US)

( * ) Notice: Subject to any disclaimer, the term of this patent is extended or adjusted under 35 U.S.C. 154(b) by 0 days.

(21) Appl. No.: 13/212,938

(22) Filed: Aug. 18, 2011

(65) Prior Publication Data

US 2012/0044705 A1 Feb. 23, 2012

Related U.S. Application Data

(60) Provisional application No. 61/374,658, filed on Aug. 18, 2010.

(51) Int. Cl.

| | |
|---|---|
| ***H02G 3/08*** | (2006.01) |
| ***F21V 17/00*** | (2006.01) |
| ***F21V 21/04*** | (2006.01) |
| ***F21V 29/15*** | (2015.01) |

(52) U.S. Cl.

CPC ............ *F21V 17/007* (2013.01); *F21V 21/048* (2013.01); *F21V 29/15* (2015.01)

(58) Field of Classification Search

USPC ............ 220/3.2, 4.01, 3.94, 4.21, 4.24, 4.26; 362/365; 174/481; 454/33; 206/315.9; 428/542.4

See application file for complete search history.

(56) References Cited

U.S. PATENT DOCUMENTS 1,675,219 A * 6/1928 Kent, Jr. ...................... 220/3.94
2,648,764 A 8/1953 Kirlin
3,281,522 A 10/1966 Anisfield
4,210,070 A 7/1980 Tatum et al.
4,237,671 A 12/1980 Munson
4,396,142 A 8/1983 Lines, Jr. et al.
4,400,766 A 8/1983 Munson
4,754,377 A 6/1988 Wenman
4,818,822 A * 4/1989 Yahraus .......................... 174/53
5,280,135 A * 1/1994 Berlin et al. .................... 174/67
5,426,573 A 6/1995 Jenkins
6,079,856 A 6/2000 Prestier
6,105,334 A 8/2000 Monson et al.
6,123,438 A 9/2000 Hentz
6,176,599 B1 1/2001 Farzen (Continued)

OTHER PUBLICATIONS

Tenmat Inc.; FF130E Regular Cover (www.recessedlightcover.com/ff130e.html).

(Continued)

*Primary Examiner* — Jeffrey Allen
(74) *Attorney, Agent, or Firm* — Stephen C. Thomas

(57) ABSTRACT

A recessed fixture cover device comprising a plurality of components that may be economically and efficiently packed in an unassembled state for transport and/or shipping and then easily assembled to provide a thermal barrier, a fire barrier, an air barrier, a moisture barrier, and/or an insect intrusion barrier between the recessed fixture and the space immediately above and external to the installed cover device. An embodiment of a cover device may comprise two components that may be assembled to form a right-angled parallelepiped shape that lacks a bottom wall thereby allowing the cover device to be lowered onto and enclose a recessed fixture. One or more complimentary connections between abutting edges of the two components allow the two components to be either quickly assembled for use or disassembled for transport or storage thereby providing a benefit to both construction professionals and do-it-yourself property owners.

8 Claims, 28 Drawing Sheets

(56) References Cited

U.S. PATENT DOCUMENTS

| | | | | |
|---|---|---|---|---|
| 6,311,858 | B1 * | 11/2001 | Csiszar | 220/4.03 |
| 6,357,891 | B1 | 3/2002 | Newbold et al. | |
| 6,516,966 | B1 * | 2/2003 | Leonard | 220/480 |
| 6,872,885 | B1 | 3/2005 | Newbold, Jr. | |
| 7,320,536 | B2 | 1/2008 | Petrakis et al. | |
| 7,511,219 | B2 * | 3/2009 | Dinh et al. | 174/66 |
| 7,651,238 | B2 | 1/2010 | O'Brien | |
| 7,670,033 | B2 | 3/2010 | Steer et al. | |
| 2008/0223601 | A1 * | 9/2008 | Johnson | 174/67 |

OTHER PUBLICATIONS

Tenmat Inc., Firefly 120 Loft Cover (http://www.naturalinsulation.com.au/Docs/Tenmat/FF120LoftCoverDataSheet.aspx).

Seal-A-Light (http://sealalight.com/ProductInformation.aspx).

* cited by examiner

INSULATED RECESSED LIGHT CAN COVER

CROSS REFERENCE TO RELATED APPLICATIONS

This application claims the benefit of provisional patent application Ser. No. 61/374,658, filed with the USPTO on Aug. 18, 2010, which is herein incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to recessed light covers, more specifically, the present invention relates to recessed light covers providing a thermal, fire, air, moisture, and/or an insect barrier.

2. Background Art

In residential and commercial buildings it is commonplace to provide insulation materials between ceiling joists to reduce heat loss from the living spaces. It is also commonplace to install recessed fixtures, such as, for example, lighting fixtures and loudspeaker units, in the living spaces which include portions that extend through the ceiling between the ceiling joists. A typical twenty unit condominium building can have hundreds of recessed lighting fixtures. It is also well known that during use, recessed fixtures, and in particular recessed lighting fixtures tend to generate a significant amount of heat, and because some insulating materials unitized in residential buildings are combustible, a fire hazard generally exists.

Current residential and commercial buildings must generally comply with certain fire safety standards such as set forth by Underwriters Laboratories (UL), National Fire Protection Association (NFPA), or other administrative agency. For example, wood joists and sheet rock are typically used to create a finished room in a residential or commercial building. When using such materials, the building room or structure must typically satisfy a specific UL “fire-rated” assembly standard. For example, one applicable test is UL’s 1 hr. Fire Rated L-500 Floor-Ceiling Assembly test. This test measures and rates a given floor-ceiling assembly for fire safety compliance, as related to flame containment and thermal transfer to adjacent joist spaces. Additional safety standards apply to recessed lighting assemblies or fixtures and electrical enclosures. UL 1598 is an example of a standard that is used to evaluate light fixtures for use in residential and commercial applications.

When installing a recessed lighting assembly in a ceiling structure, the lighting assembly is typically attached to the joist rafters or I-beams (e.g., “ceiling support members”). After making the proper electrical connections, drywall is usually attached to the ceiling support members concealing the recessed lighting assembly. The installer then cuts a hole into a surface of the drywall of the ceiling to access the recessed lighting assembly below the ceiling surface for fixture lamping, and finished trim installation. As a result the recessed lighting assembly is positioned in relation to the ceiling surface to distribute light into the room.

However, one problem associated with installing a recessed lighting assembly in such a manner is that the hole cut in the surface can change the UL fire safety ratings of the floor-ceiling assembly as a result of the ceiling structure being breached. For example, by cutting a hole into the ceiling, a non-continuous surface results and the floor-ceiling assembly may no longer satisfy certain UL fire safety standards. Allowing either flame, heat or both to enter the space above the floor-ceiling assembly may cause severe damage or total loss of the structure.

To overcome this problem when installing a recessed lighting assembly, a builder or installer may fabricate a conventional “fire box” around the recessed lighting assembly just prior to installation to create a continuous ceiling surface. The “fire box” is typically made from the same drywall used to form an adjacent ceiling. Most building inspectors interpret such a continuous ceiling surface as complying with all applicable fire standards as long as the appropriate materials are used. However, because the fire box is unattached and must be fabricated by the installer separately from the lighting assembly, a substantial amount of additional time, materials and expense can be incurred. Moreover, because most builders are unsure of the minimum size box to provide sufficient fire safety, exceedingly large boxes are typically utilized, causing unnecessary cost and expense.

Another conventional solution is to purchase prefabricated enclosures designed to fit between the ceiling support members. These prefabricated enclosures, however, are also often larger than necessary to enclose the recessed lighting assembly, causing unnecessary costs to be incurred.

Another conventional solution is to purchase and install recessed lighting assemblies that have been rated and UL listed to maintain the fire rating when installed properly. These conventional assemblies typically include a light fixture enclosed with a separate or integrally formed box that contains a fire rated material such as disclosed in U.S. Pat. Nos. 6,105,334 and 6,357,891. The fire rated materials used for these enclosures typically include an aluminum support structure with fire rated drywall walls or a stamped metal structure with all internal bottom and wall surfaces having a cementitious or intumescent layer. However, the cost of these conventional preassembled recessed light fixtures is typically very high due to the labor and material expense required to fabricate the drywall panel walls and support structure or to stamp and coat all internal surfaces. In addition, the weight of each of these conventional preassembled recessed light fixtures increases the difficulty of installing the respective recessed lighting assembly.

Therefore, a need exists for a recessed lighting assembly that overcomes the problems noted above and others previously experienced for inhibiting a fire in a room from traveling through a ceiling, floor, or wall of the room via the recessed lighting assembly. These and other needs will become apparent to those of skill in the art after reading the present specification.

BRIEF SUMMARY OF THE INVENTION

In accordance with one embodiment of the present invention, a recessed fixture cover device comprising a plurality of components, wherein each of the plurality of components comprises at least one complimentary connection between each of the adjacent plurality of components, the device is capable of being transported in a disassembled state and then assembled for use when the at least one complimentary connection between adjacent plurality of components is united.

In accordance with another embodiment of the present invention, the plurality of components may comprise a first component and a second component, wherein the first component comprises a right-angled parallelepiped shape configuration and the second component comprises a cylindrical trough shape configuration.

In accordance with still another embodiment of the present invention, the first component may comprise a left wall, a rear wall disposed perpendicular to the left wall, and a first top wall disposed perpendicular to both the left wall and the rear wall wherein the junction of the left wall, the rear wall, and the first top wall forms a three dimensional first component right angle corner. The second component may comprise a right wall, a front wall disposed perpendicular to the right wall, and a second top wall disposed perpendicular to both the right wall and the front wall wherein the junction of the right wall, the front wall, and the second top wall forms a three dimensional second component right angle corner.

In accordance with yet still another embodiment of the present invention, the device may comprise a right-angled parallelepiped shape configuration when the first component and the second component are in communication at the at least one complimentary connection, the first component and the second component define an open bottom wall in the right-angled parallelepiped shape configuration and the device is thereby capable of receiving a fixture there through.

In each of the embodiments, each of the at least one complimentary connections may be independently selected from the group consisting of a tongue and groove joint, a step joint, a dovetail joint, a box joint, a mortise and tenon joint, a dado joint, a dowel butt joint, a butt joint, a lap joint, a halving joint, hook and loop fasteners, and snap fasteners.

Other systems, apparatus, methods, features, and advantages of the present invention will be or will become apparent to one with skill in the art upon examination of the following figures and detailed description. It is intended that all such additional systems, methods, features, and advantages be included within this description be within the scope of the invention, and be protected by the accompanying claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE INVENTION

Figure 1:
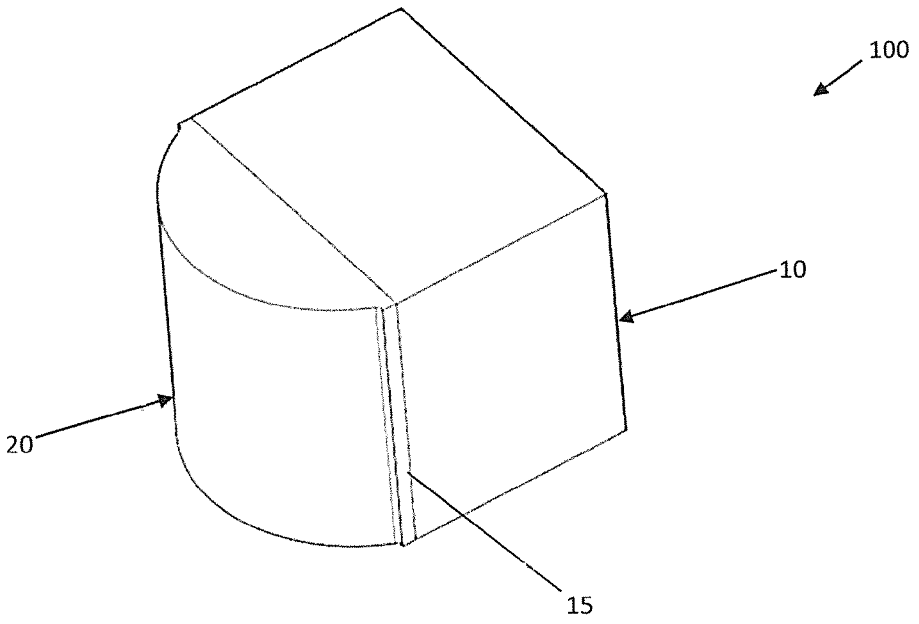
FIG. 1 depicts a top perspective view of an embodiment of a cover device of the present invention.

Although a detailed description as provided in the attachments contains many specifics for the purposes of illustration, anyone of ordinary skill in the art will appreciate that many variations and alterations to the following details are within the scope of the present invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

Reference will now be made in detail to an implementation consistent with the present invention as illustrated in the accompanying drawings. Wherever possible, the same reference numbers will be used throughout the drawings and the following description to refer to the same or like parts. As would be understood to one of ordinary skill in the art, certain components or elements for installation of a recessed light fixture (e.g., building support members, hanger arms, junction box, or electrical connections) are not shown in the figures or specifically noted herein to avoid obscuring the invention.

The present invention comprises a thermal insulation cover for recessed lighting fixtures in new or existing, commercial or residential construction applications. The present invention provides for multiple protective functions with one, cost-effective, and permanent solution that can be easily installed by professionals and do-it-yourselfers within minutes for each respective application.

The present inventive recessed fixture cover device further provides beneficial physical characteristics and properties that heretofore have been unavailable in the prior art. The present invention provides a thermal insulation barrier between a recessed lighting fixture and the space immediately above and external to the cover device of the present invention (e.g. attic space). The drastic difference in temperatures between the attic space and living spaces of structures in warm or cold climates creates a substantial loss in energy efficiency. For this reason, contractors and home owners alike have traditionally spent a great deal of time and money insulating these two spaces from each other only to then turn around and add recessed lighting to the ceiling without appropriate adjustments being made to the insulation. Recessed lighting is an effective and space-saving option for many construction projects today, however, installing these recessed lighting fixtures without proper insulation adjustments creates a one cubic foot hole in both the ceiling and traditional insulation. This process negates much of the initial insulation investment and is a detriment to the energy efficiency of the structure. The recessed fixture cover device of the present invention may effectively stop thermal intrusion created by recessed lighting in cold or hot climates thereby increasing energy efficiency and saving money.

The present invention further provides a fire barrier between a recessed lighting fixture and the space immediately above and external to the recessed fixture cover device. The majority of recessed can lighting sold within the prior art are not rated for contact with insulation products, this means that additional batt insulation or blown in insulation for retrofit or new construction applications is not a viable option in solving this energy sapping problem. Building codes typically require three inches of space between either batt insulation or blown in insulation and the lighting fixture itself. Not meeting this building code requirement creates a severe fire hazard due to the fixture's inability to dissipate the heat below the low flash point of most common insulation products. A cover device of the present invention provides a fire barrier between existing, traditional insulation and recessed lighting fixtures in addition to being an energy-saving thermal barrier as already disclosed above.

The present invention still further may act as an air, moisture, and/or insect intrusion barrier between a recessed light fixture and the space immediately above and external to the present inventive cover device. According to the Pennsylvania housing research center, each recessed lighting fixture within a building may leak ten cubic feet of air per minute and dump one third of a gallon of moisture into the attic space per day. These deficiencies may result in annual power consumption losses in the range of $5 to $45 per recessed lighting fixture for the building owner.

In preferred embodiments, a recessed fixture cover device of the present invention may comprise a plurality of components. Each of the adjacent components from the plurality of components may have at least one complimentary connection disposed there between allowing the device to easily be assembled from the plurality of components. This allows the plurality of components to be shipped or stored in a compact, economical, and/or efficient manner with the device in a disassembled state and then the device may be quickly assembled via the at least one complimentary connection(s) for use and installation as needed. While the preferred embodiment depict a cover device comprising two components, the scope of the present invention include cover devices having more than two components as well.

As shown in FIGS. 1-45, a device 100 of the present invention may comprise a first component 10 and a second component 20 having at least one complimentary connection 15 there between allowing for easier disassembled storage and transportation wherein the components may later be combined and/or connected to form the cover device 100 prior to installation above a recessed lighting fixture or the like. The size and shape of each of the first component 10 and second component 20 may be freely customized or changed to conform to the overall dimensions of a specific recessed light fixture that is to be covered.

To form the at least one complimentary connection 15, the first component 10 may comprise a first connector 15*a* and the second component 20 may comprise a second connector 15*b* that is complimentary to the first connector 15*a* thereby allowing the first component 10 to be connected to the second component 20 prior to installation. The first connector 15*a* and the second connector 15*b* may be freely interchangeable and are not dependent on being disposed specifically upon either the first component 10 or the second component 20. The first connector 15*a* and second connector 15*b* enable immediately adjacent components to be connected and thereby complete the assembly of the recessed fixture cover device 100 of the present invention.

The first connector 15*a* and second connector 15*b* of all embodiments of the present invention may include but are not limited to structures capable of comprising a tongue and groove joint, a step joint, a dovetail joint, a box joint, a mortise and tenon joint, a dado joint, a dowel butt joint, a butt joint, a lap joint, a halving joint, hook and loop fasteners, snap fasteners, and any other connectors known within the art. In preferred embodiments, the first connector 15*a* and second connector 15*b* may include but are not limited to structures comprising a tongue and groove joint, a step joint, and a butt joint.

Figure 2:
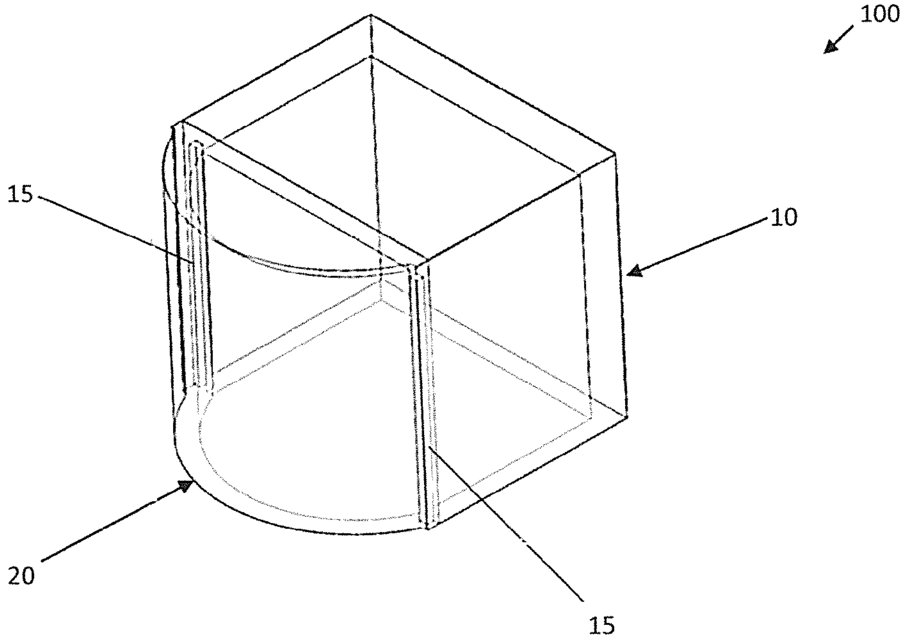
FIG. 2 depicts a transparent top perspective view of the embodiment of a cover device of the present invention from FIG. 1.
Figure 3:
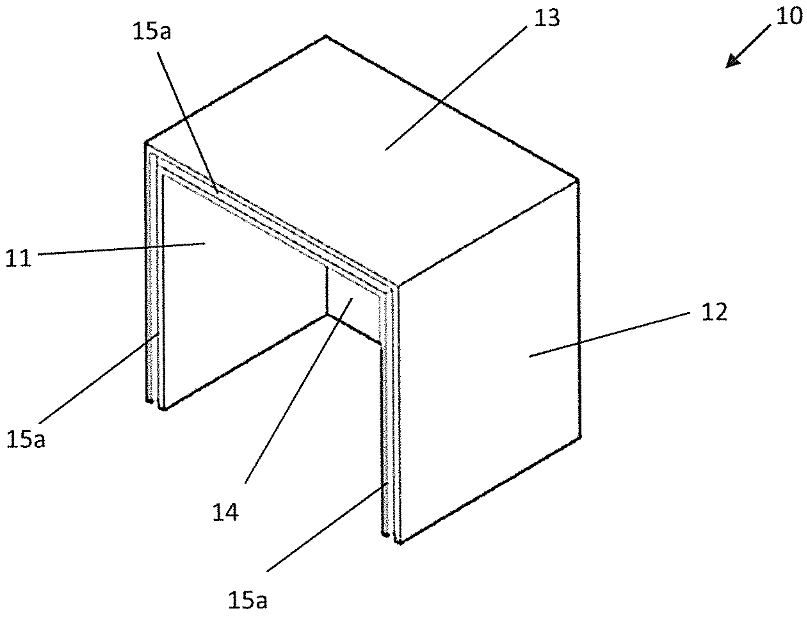
FIG. 3 depicts a top perspective view of an embodiment of a first component of the cover device of the present invention.
Figure 4:
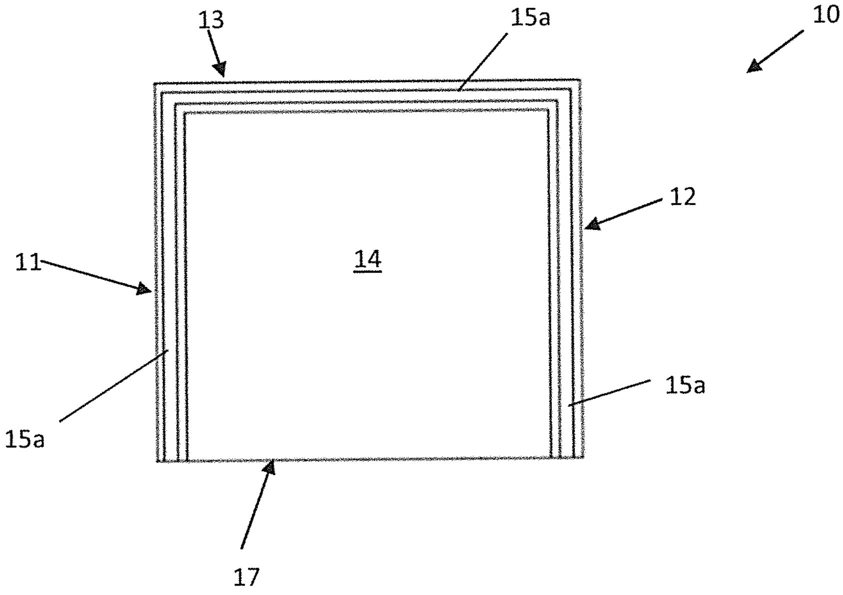
FIG. 4 depicts a front view of the embodiment of the first component of the cover device of the present invention from FIG. 3.
Figure 5:
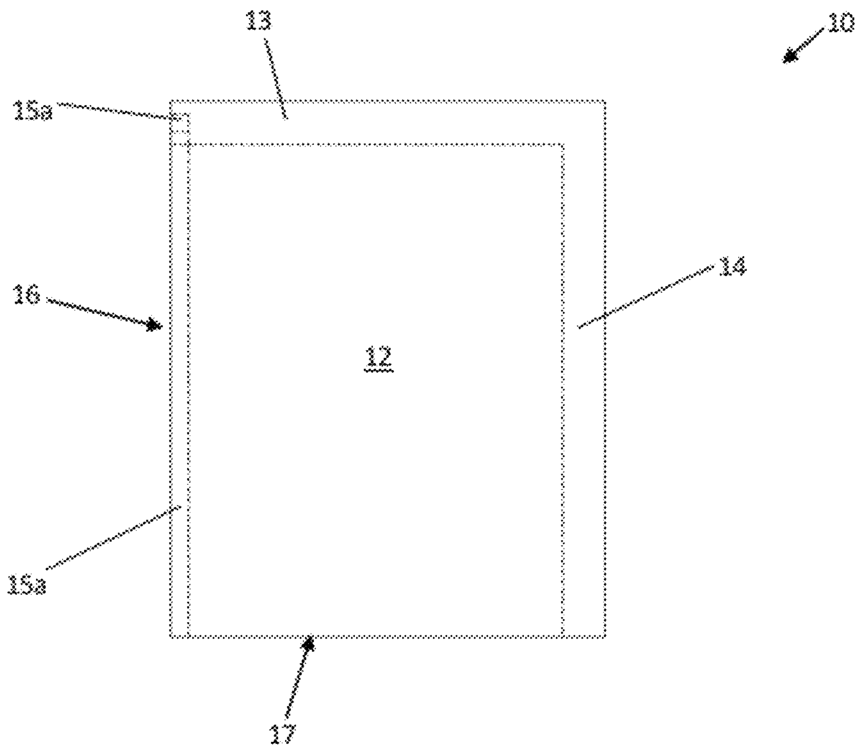
FIG. 5 depicts a transparent side view of the embodiment of the first component of the cover device of the present invention from FIG. 3.
Figure 6:
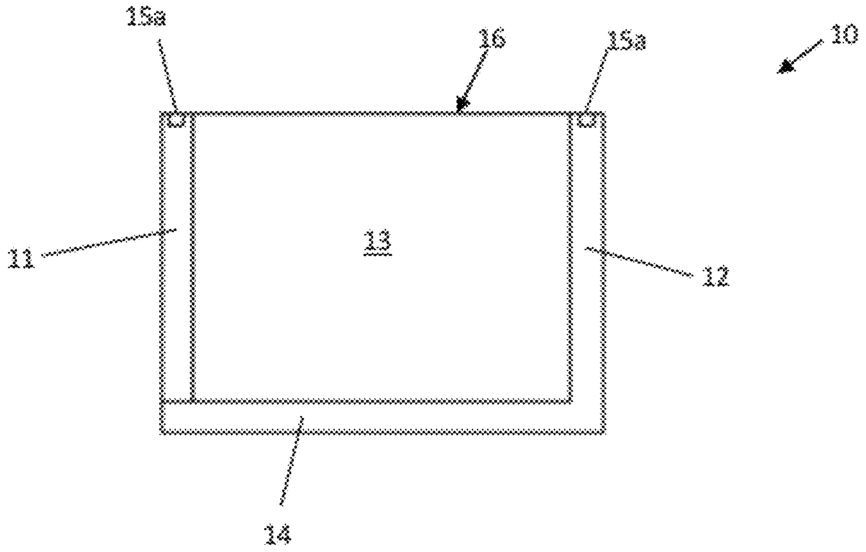
FIG. 6 depicts a bottom view of the embodiment of the first component of the cover device of the present invention from FIG. 3.

As shown in FIGS. 1-10, one embodiment of a cover device 100 may comprise a first component 10 having a right-angled parallelepiped shape configuration and a second component 20 having a cylindrical trough shape configuration. An exemplary first component 10 is shown in FIGS. 3-6 and may comprise four solid faces (comprising a left wall 11, a right wall 12, a top wall 13, and a rear wall 14) and two open faces (comprising an open front face 16 and an open bottom face 17). In a preferred embodiment as best shown in FIGS. 3-4, one or more edges on each of the left wall 11, the right wall 12, and/or the top wall 13 or any combination thereof may further comprise a first connector 15*a* allowing for at least one complimentary connection 15 thereon, respectively. In an alternative embodiment, FIG. 2 depicts a first connector 15*a* on at least one edge of the left wall 11 and right wall 12 of the first component 10 with no first connector 15*a* disposed on at least one edge of the top wall 13.

Figure 7:
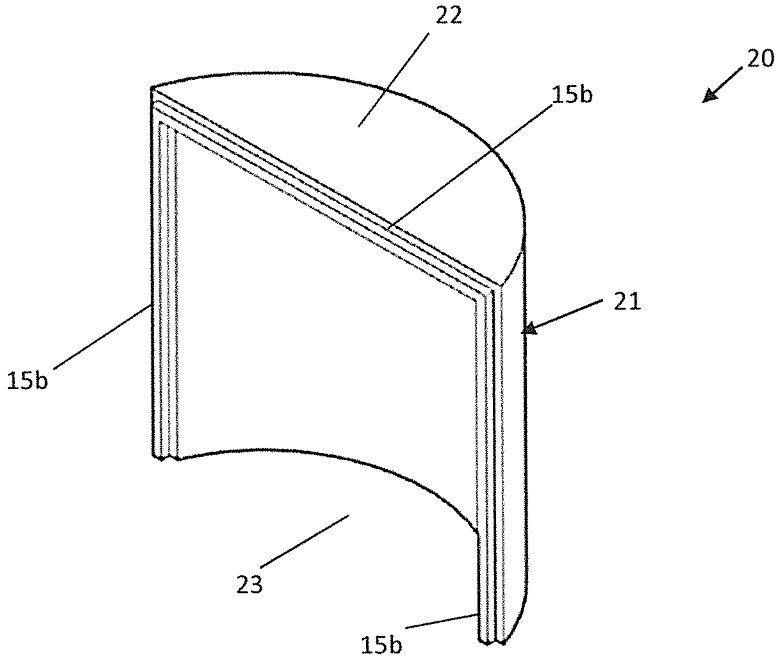
FIG. 7 depicts a top perspective view of an embodiment of a second component of the cover device of the present invention.
Figure 8:
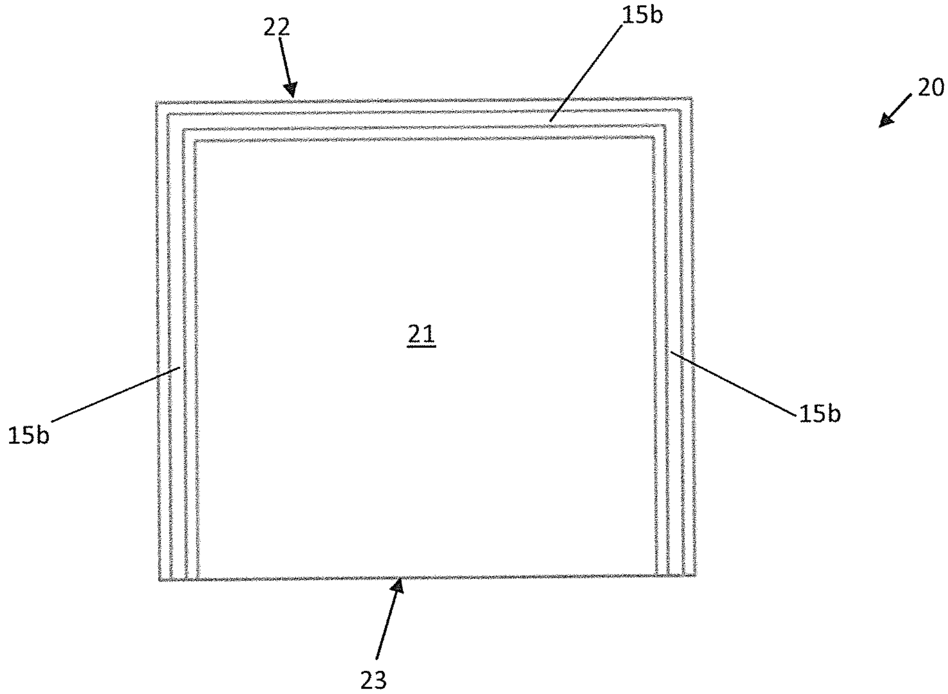
FIG. 8 depicts a rear view of the embodiment of the second component of the cover device of the present invention from FIG. 7.
Figure 9:
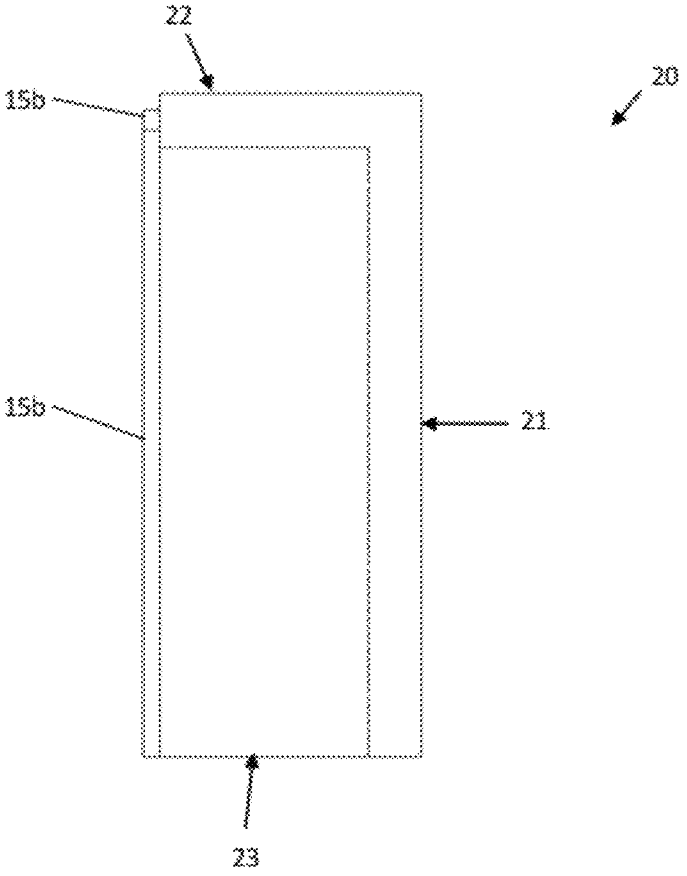
FIG. 9 depicts a side view of the embodiment of the second component of the cover device of the present invention from FIG. 7.
Figure 10:
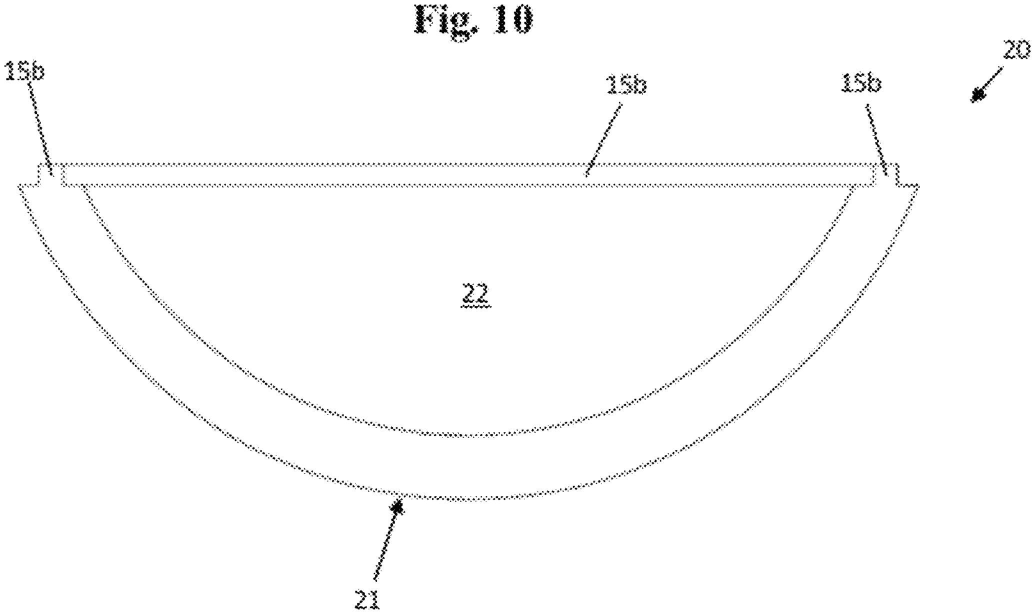
FIG. 10 depicts a bottom view of the embodiment of the second component of the cover device of the present invention from FIG. 7.
Figure 11:
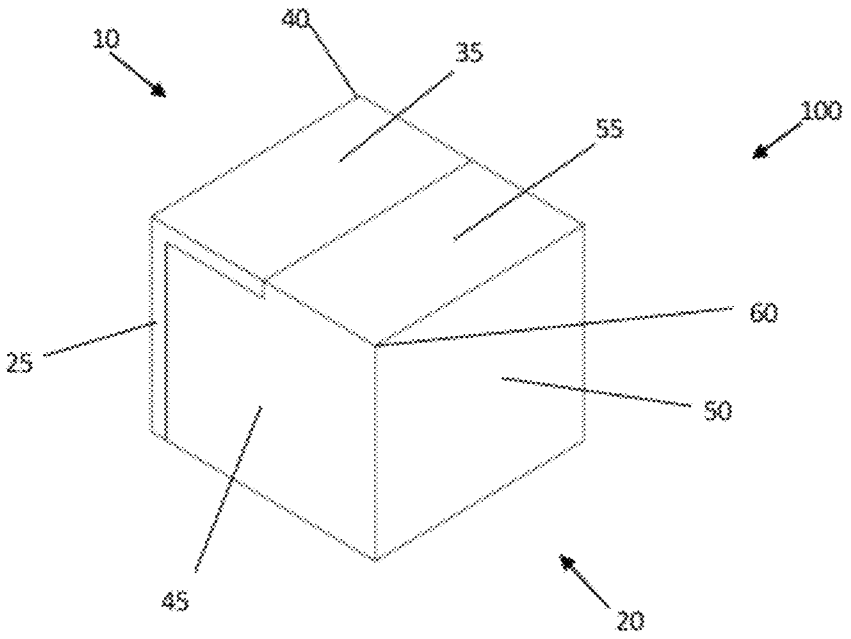
FIG. 11 depicts a top perspective view of another embodiment of a cover device of the present invention.
Figure 12:
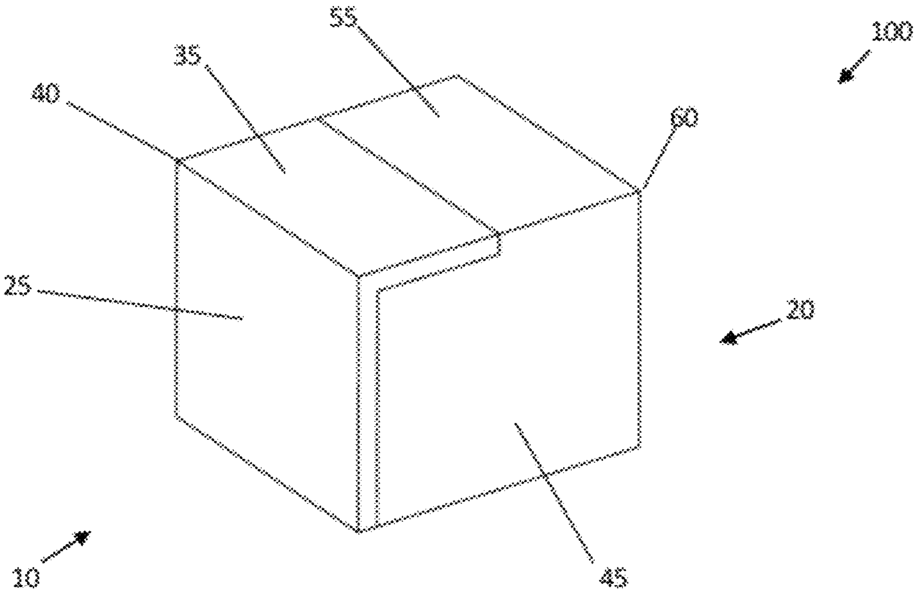
FIG. 12 depicts another top perspective view of the embodiment of a first component of the cover device of the present invention from FIG. 11.
Figure 13:
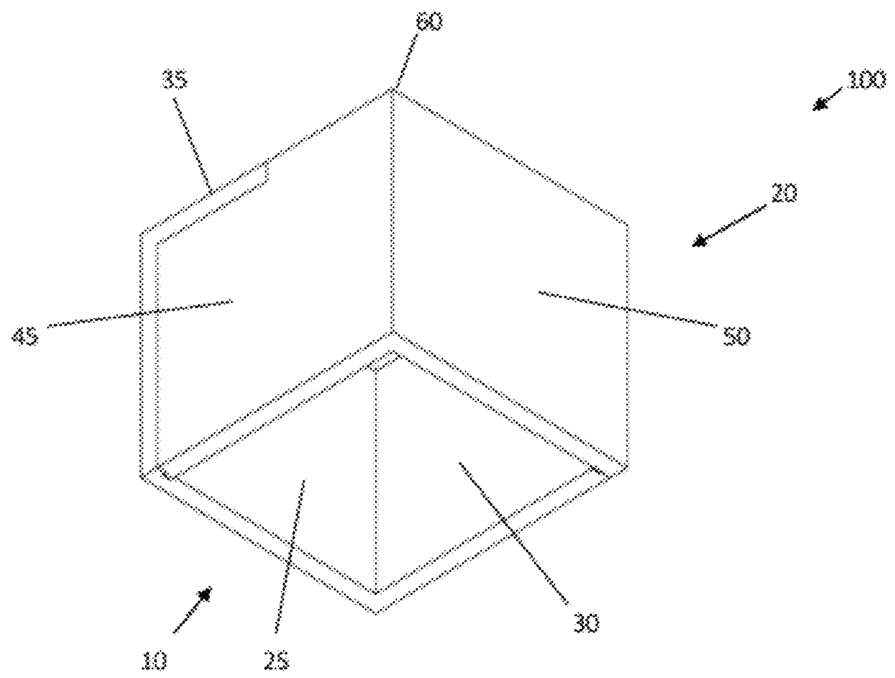
FIG. 13 depicts a bottom perspective view of the embodiment of the first component of the cover device of the present invention from FIG. 11.
Figure 14:
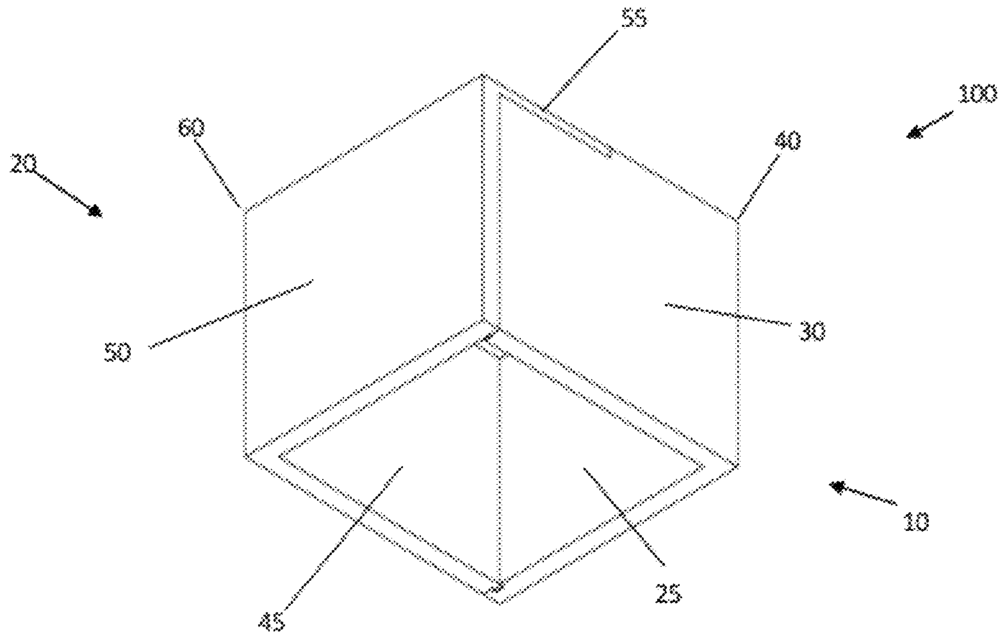
FIG. 14 depicts another bottom perspective view of the embodiment of the first component of the cover device of the present invention from FIG. 11.
Figure 15:
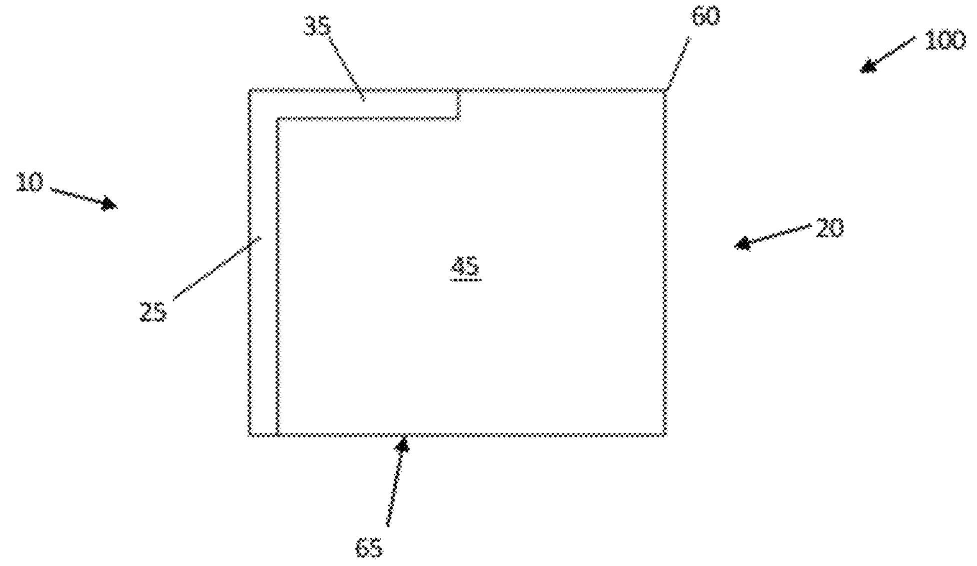
FIG. 15 depicts a front view of the embodiment of the first component of the cover device of the present invention from FIG. 11.
Figure 16:
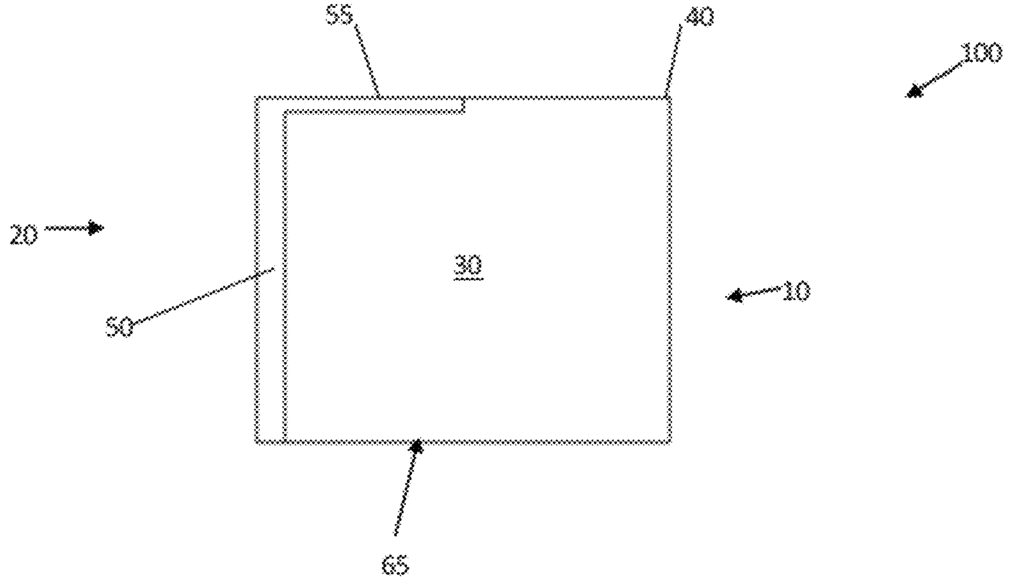
FIG. 16 depicts a rear view of the embodiment of the first component of the cover device of the present invention from FIG. 11.
Figure 17:
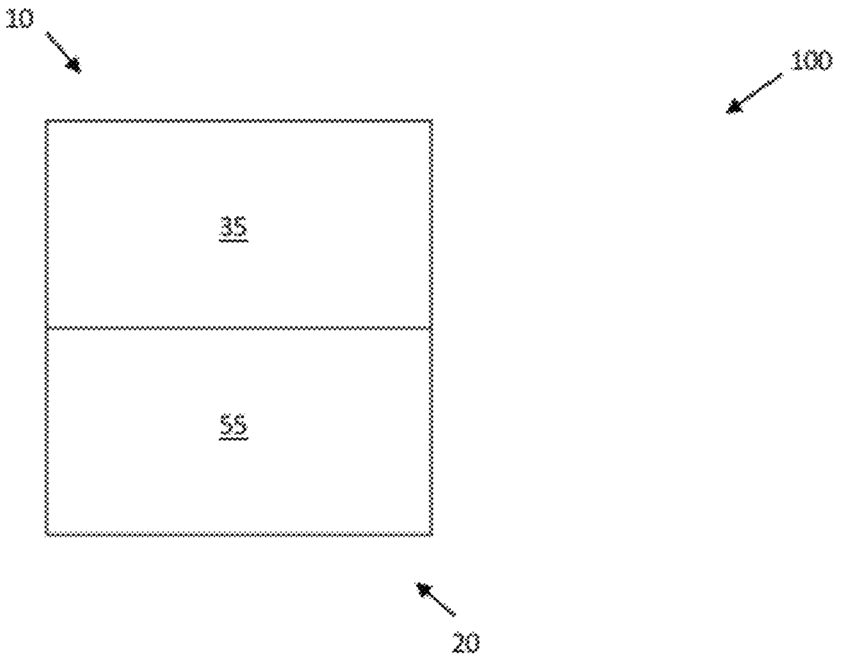
FIG. 17 depicts a top view of the embodiment of the first component of the cover device of the present invention from FIG. 11.
Figure 18:
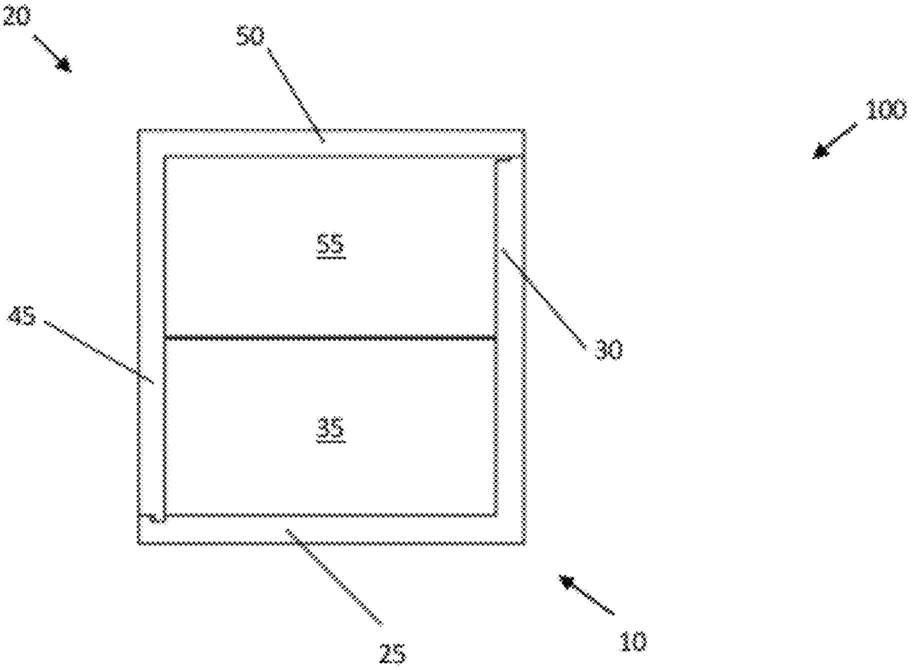
FIG. 18 depicts a bottom view of the embodiment of the first component of the cover device of the present invention from FIG. 11.
Figure 19:
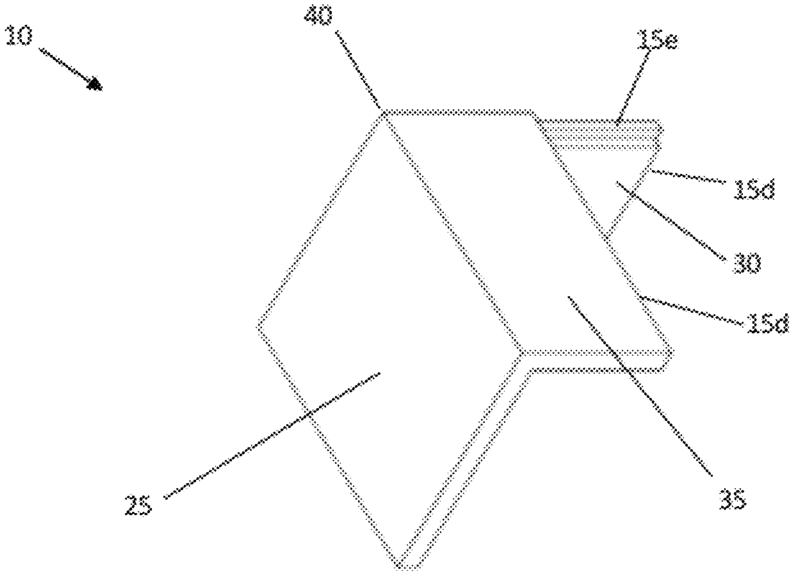
FIG. 19 depicts a top perspective view of an embodiment of a first component of the cover device of the present invention.
Figure 20:
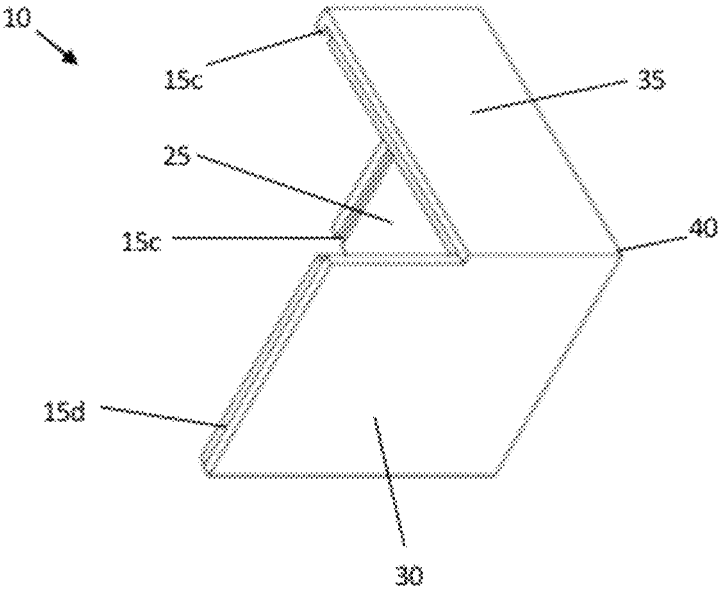
FIG. 20 depicts another top perspective view of the embodiment of the first component of the cover device of the present invention from FIG. 19.

An exemplary second component 20 is shown in FIGS. 7-10 and may comprise a cylindrical trough solid curved surface 21, a solid end face 22 at a first end of the cylindrical trough curved solid surface 21, and an open end face 23 at a second end of the cylindrical trough curved solid surface 21. In a preferred embodiment as best shown in FIGS. 7-8, one or more edges on each of the cylindrical trough solid curved surface 21 and solid end face 22 may further comprise a second connector 15*b* allowing for at least one complimentary connection 15 thereon, respectively. In an alternative embodiment, FIG. 2 depicts a second connector 15*b* on at least one edge of the cylindrical trough solid curved surface 21 of the second component 20 (shown having a second connector 15*b* on two edges) with no second connector 15*b* disposed on at least one edge of the solid end face 22.

In use, devices 100 of the present invention may be shipped and/or stored as separate first components 10 and second components 20 (or more when a device 100 comprises three or more components). When ready for use and installation, the first component 10 and second component 20 may be married or united along at least one complimentary connection 15 in the form of one or more first connectors 15*a* on the first component 10 and one or more second connectors 15*b* on the second component 20. When the cover device 100 is assembled as shown in FIGS. 1-2, the open bottom face 17 of the first component 10 and the open end face 23 of the second component 20 are immediately adjacent to each other and provide the cover device 100 with an open bottom planar surface. The cover device 100 may be placed over a recessed light fixture (or any other fixture) with the fixture passing through the open bottom planar surface of the cover device 100 and the cover device 100 then being secured and/or sealed to the dry wall, sheet rock, or other surface supporting the fixture by foam or any other manner known within the art.

As shown in FIGS. 11-45, another embodiment of a cover device 100 of the present invention may comprise a first component 10 comprising three walls and a second component 20 comprising three walls wherein the assembled cover device 100 may comprise a right-angled parallelepiped shape configuration (see FIGS. 11-18). An exemplary first component 10 is shown in FIGS. 19-26 and may comprise a left wall 25, a rear wall 30, and a first top wall 35. In a preferred embodiment, the rear wall 30 may be disposed perpendicular to the left wall 25 and the first top wall 35 may be disposed perpendicular to both the left wall 25 and the rear wall 30 with the junction of the left wall 25, rear wall 30, and first top wall 35 forming a three dimensional first component right angle corner 40. The respective walls (25/30/35) need not be planar, as shown in the preferred embodiment, but may comprise any shape known in the art such as curved surfaces or any other shape that allows the cover device 100 to fit over a recessed fixture. With such alternatively shaped walls, the junction or intersection of the three walls (25/30/35) may no longer be a three dimensional first component right angle corner 40 as shown in the preferred embodiment of FIGS. 19-26.

Figure 21:
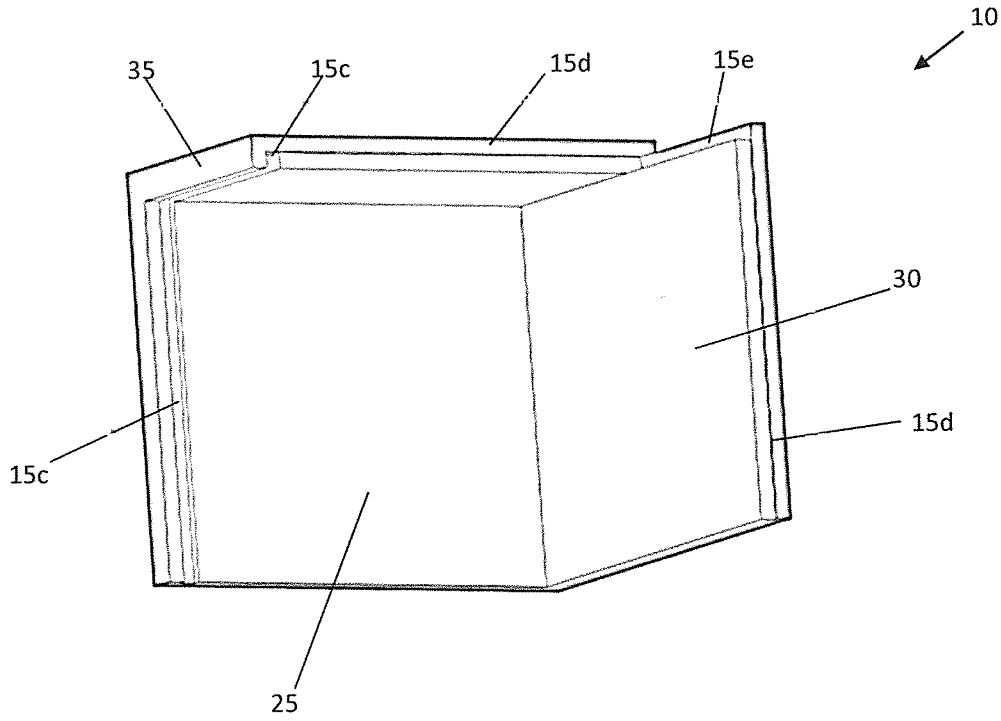
FIG. 21 depicts another bottom perspective view of the embodiment of the first component of the cover device of the present invention from FIG. 19.
Figure 22:
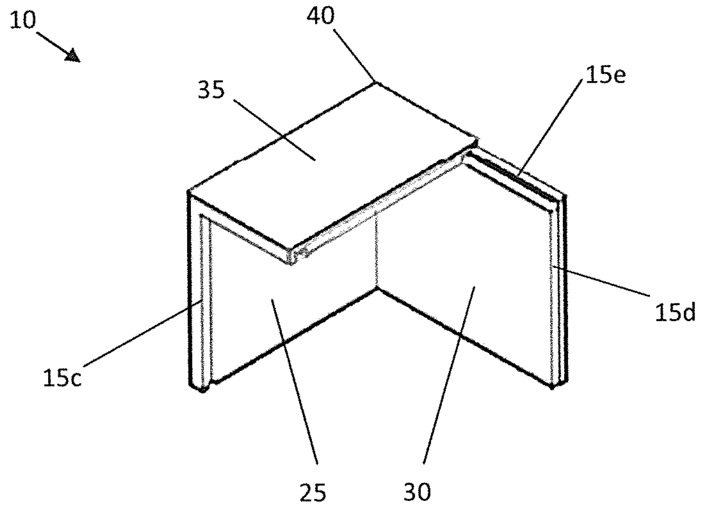
FIG. 22 depicts another top perspective view of the embodiment of the first component of the cover device of the present invention from FIG. 19.
Figure 23:
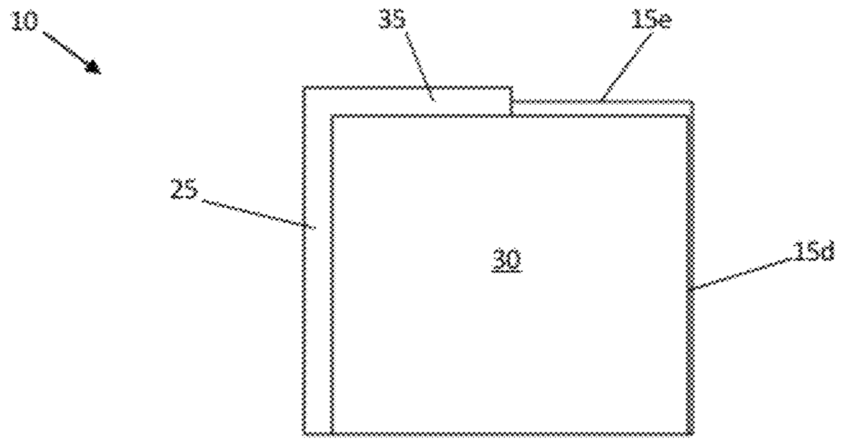
FIG. 23 depicts a front view of the embodiment of the first component of the cover device of the present invention from FIG. 19.
Figure 24:
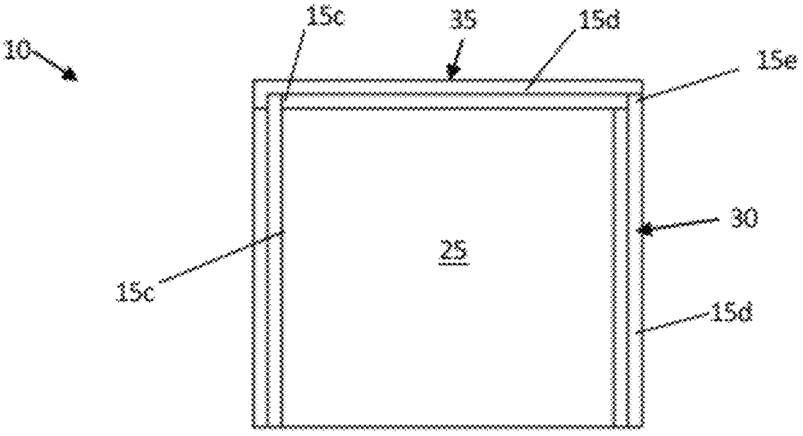
FIG. 24 depicts a right side view of the embodiment of the first component of the cover device of the present invention from FIG. 19.
Figure 25:
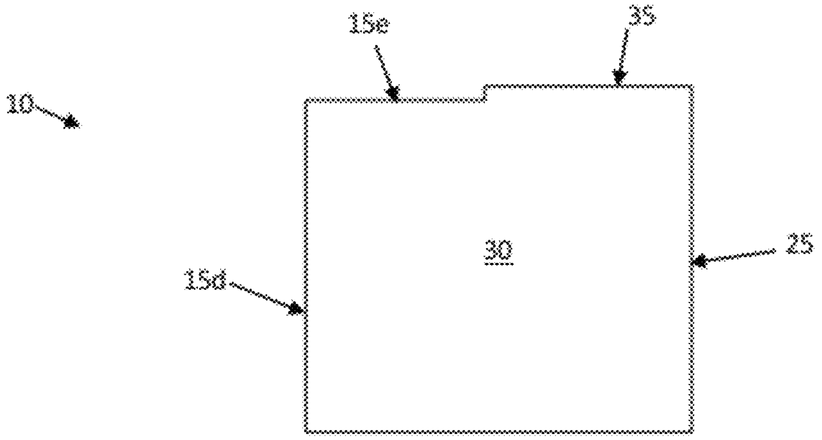
FIG. 25 depicts a rear view of the embodiment of the first component of the cover device of the present invention from FIG. 19.
Figure 26:
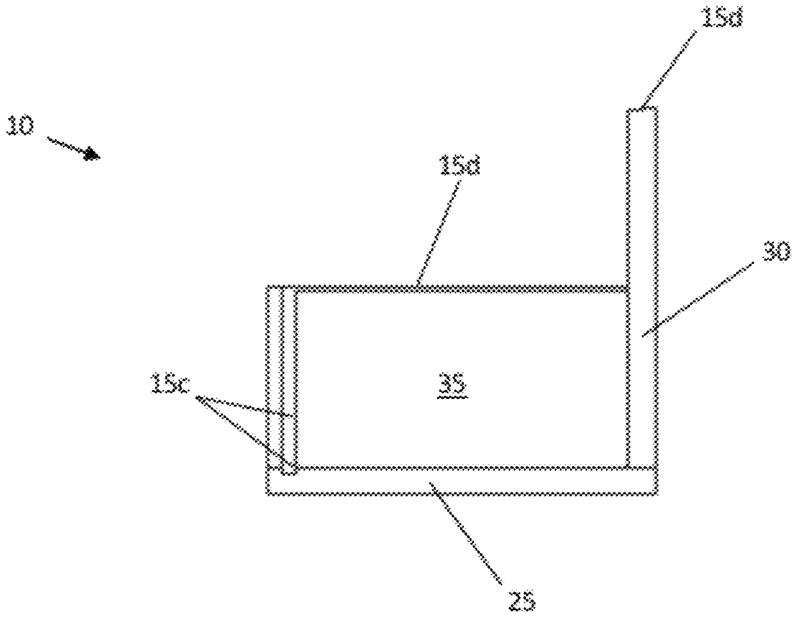
FIG. 26 depicts a bottom view of the embodiment of the first component of the cover device of the present invention from FIG. 19.
Figure 27:
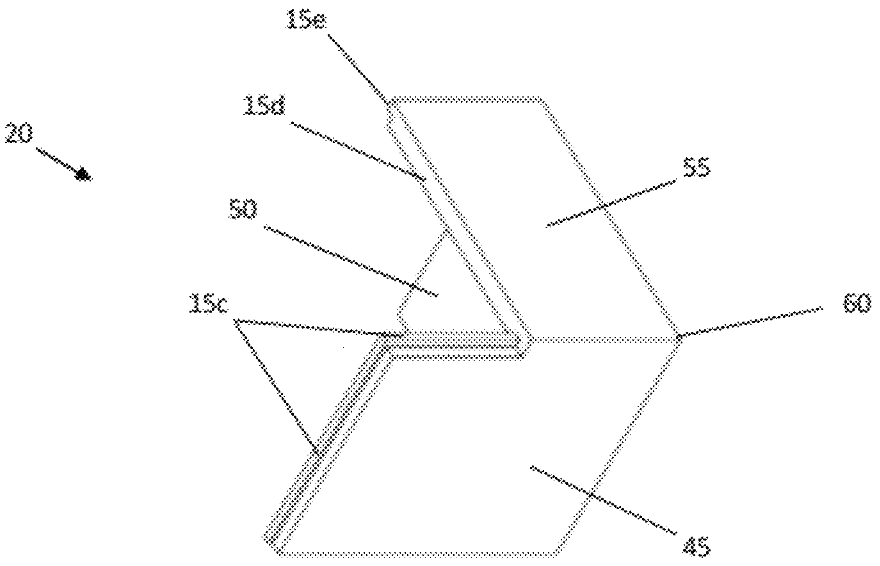
FIG. 27 depicts a top perspective view of an embodiment of a second component of the cover device of the present invention.
Figure 28:
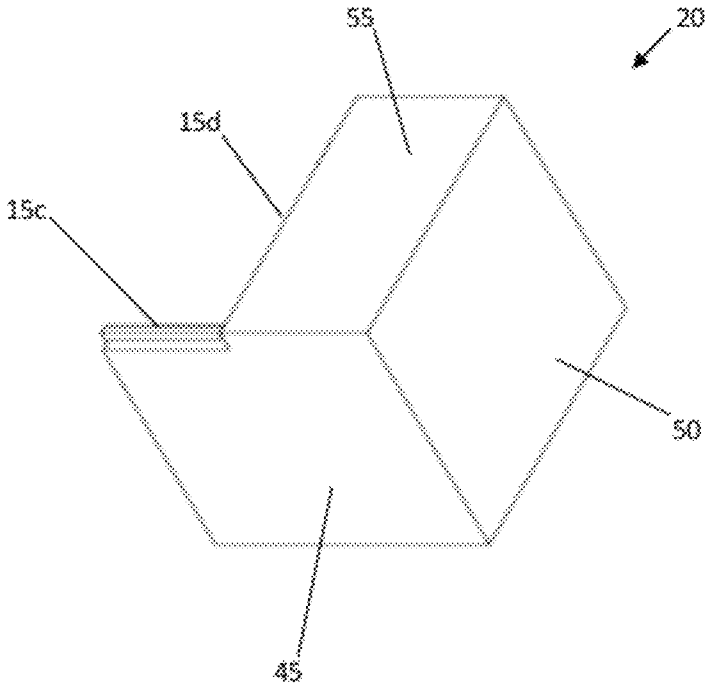
FIG. 28 depicts another top perspective view of the embodiment of the second component of the cover device of the present invention from FIG. 27.
Figure 29:
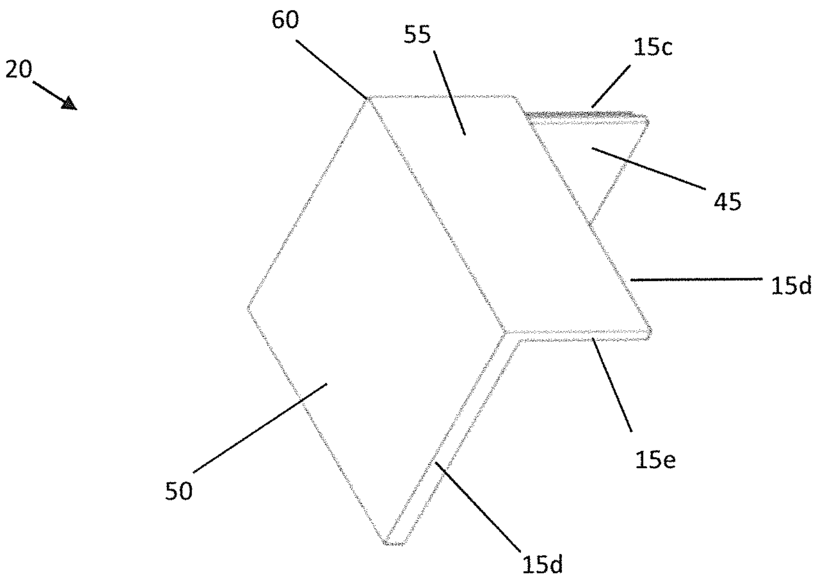
FIG. 29 depicts another top perspective view of the embodiment of the second component of the cover device of the present invention from FIG. 27.

As best shown in FIG. 21, one or more edges on each of the left wall 25, the rear wall 30, and/or the first top wall 35 or any combination thereof may further comprise a first connector 15*a* allowing for at least one complimentary connection 15 to be formed when and where the first component 10 is united and/or mated with the second component 20 (as shown in FIGS. 39-45). Such first connectors 15*a* may include but are not limited to structures capable of comprising a portion of a tongue and groove joint, a step joint, a dovetail joint, a box joint, a mortise and tenon joint, a dado joint, a dowel butt joint, a butt joint, a lap joint, a halving joint, hook and loop fasteners, snap fasteners, and any other connectors known within the art. In preferred embodiments, the first connectors 15*a* may include but are not limited to structures comprising a portion of a tongue and groove joint, a step joint, and a butt joint. In a preferred embodiment and as shown in FIGS. 19-26 and 39-45, at least one edge of the left wall 25 may comprise a first connector 15*a* in the form of a tongue and groove joint element 15*c*, at least one edge of the rear wall 30 may comprise a first connector 15*a* in the form of a butt joint element 15*d* and at least one edge of the rear wall 30 may comprise a first connector 15*a* in the form of a step joint element 15*e*, and at least one edge of the first top wall 35 may comprise a first connector 15*a* in the form of a tongue and groove joint element 15*c* and at least one edge of the first top wall 35 may comprise a first connector 15*a* in the form of a butt joint element 15*d*. The scope of the present invention is not so narrowly limited however and the scope of the present invention includes structural substitutions for the first connector 15*a* with any and all connectors and/or joint elements known within the art.

An exemplary second component 20 of the cover device 100 of FIGS. 11-18 is shown in FIGS. 27-35 and may comprise a front wall 45, a right wall 50, and a second top wall 55. In a preferred embodiment, the right wall 50 may be disposed perpendicular to the front wall 45 and the second top wall 55 may be disposed perpendicular to both the front wall 45 and the right wall 50 with the junction of the front wall 45, right wall 50, and second top wall 55 forming a three dimensional second component right angle corner 60. The respective walls (45/50/55) need not be planar, as shown in the preferred embodiment, but may comprise any shape known in the art such as curved surfaces or any other shape that allows the cover device 100 to fit over a recessed fixture. With such alternatively shaped walls, the junction or intersection of the three walls (45/50/55) may no longer be a three dimensional second component right angle corner 60 as shown in the preferred embodiment of FIGS. 27-35.

Figure 30:
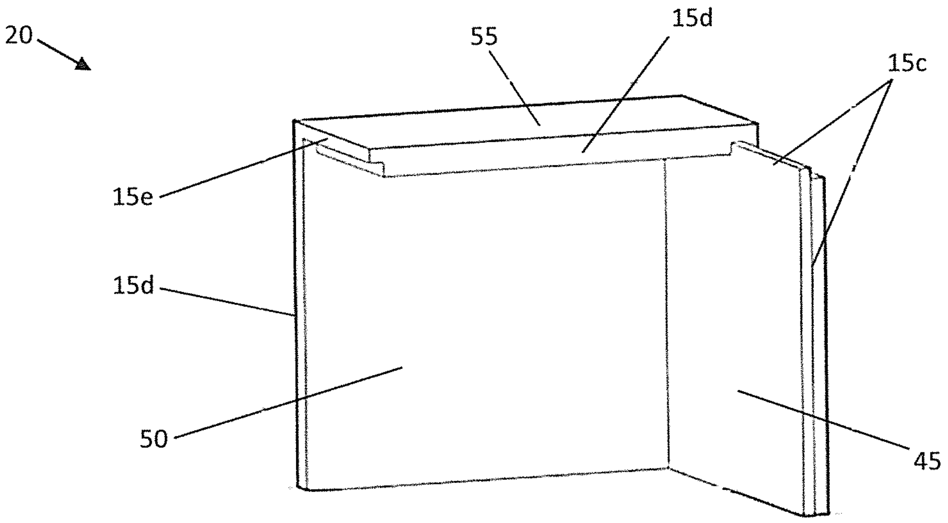
FIG. 30 depicts another top perspective view of the embodiment of the second component of the cover device of the present invention from FIG. 27.
Figure 31:
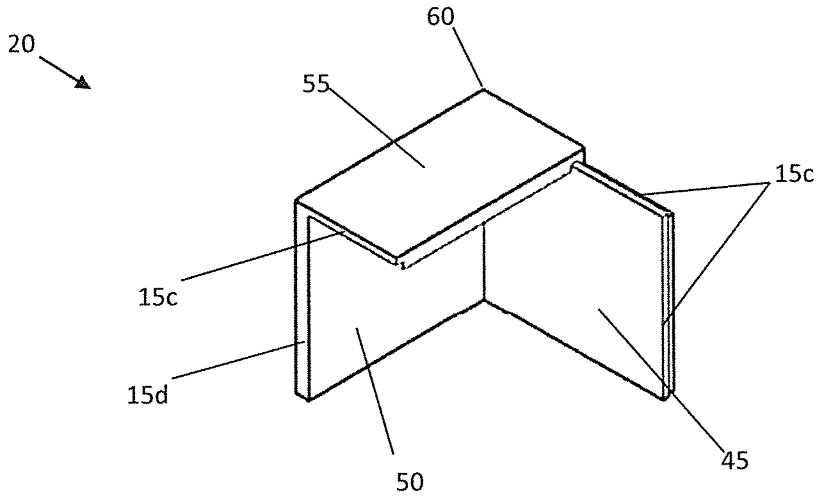
FIG. 31 depicts another top perspective view of the embodiment of the second component of the cover device of the present invention from FIG. 27.
Figure 32:
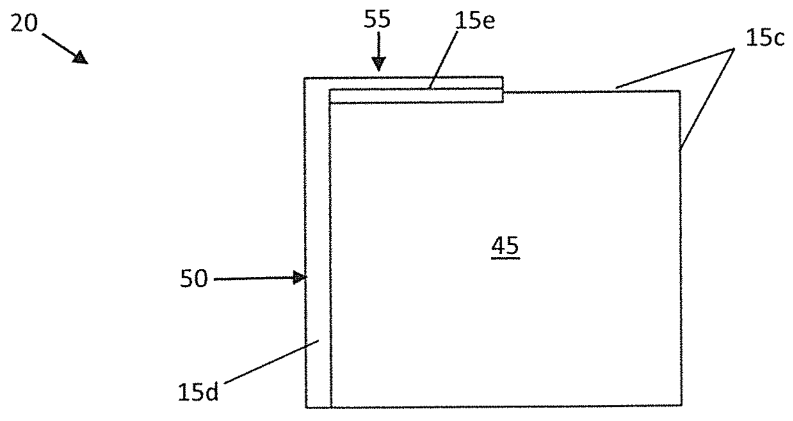
FIG. 32 depicts a rear view of the embodiment of the second component of the cover device of the present invention from FIG. 27.
Figure 33:
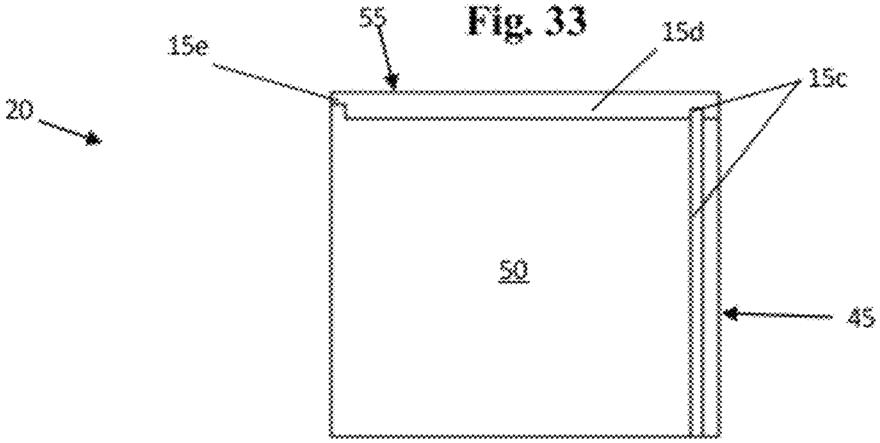
FIG. 33 depicts a left side view of the embodiment of the second component of the cover device of the present invention from FIG. 27.
Figure 34:
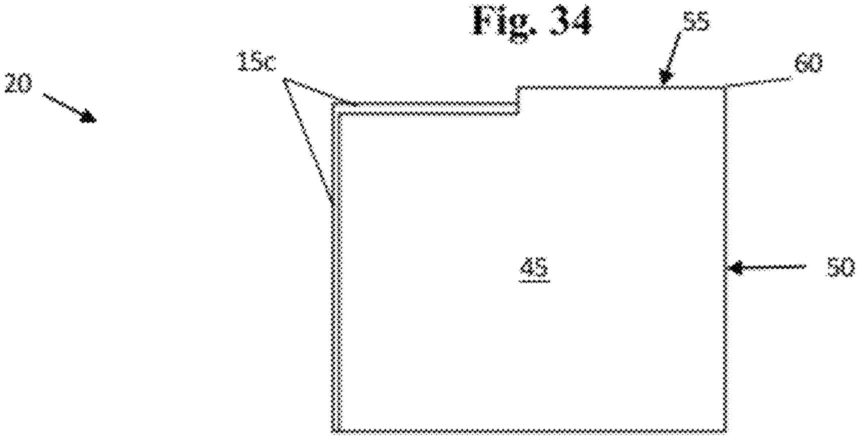
FIG. 34 depicts a front view of the embodiment of the second component of the cover device of the present invention from FIG. 27.
Figure 35:
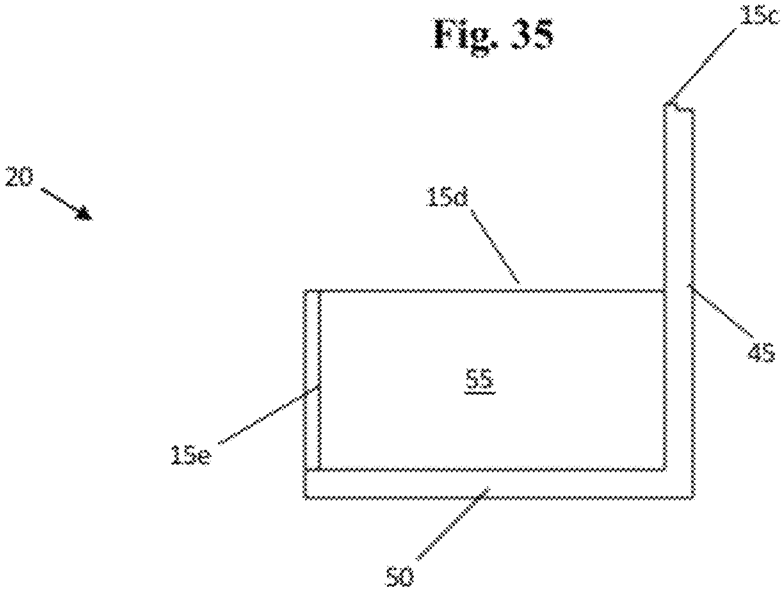
FIG. 35 depicts a bottom view of the embodiment of the second component of the cover device of the present invention from FIG. 27.
Figure 36:
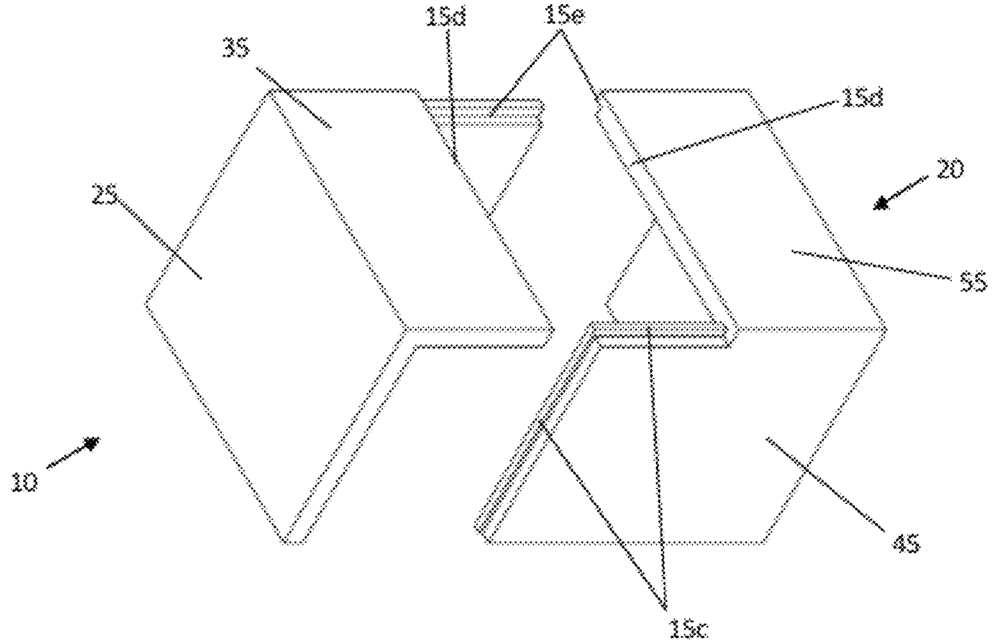
FIG. 36 depicts an exploded top perspective view of the embodiment of the cover device of the present invention from FIGS. 11-18.
Figure 37:
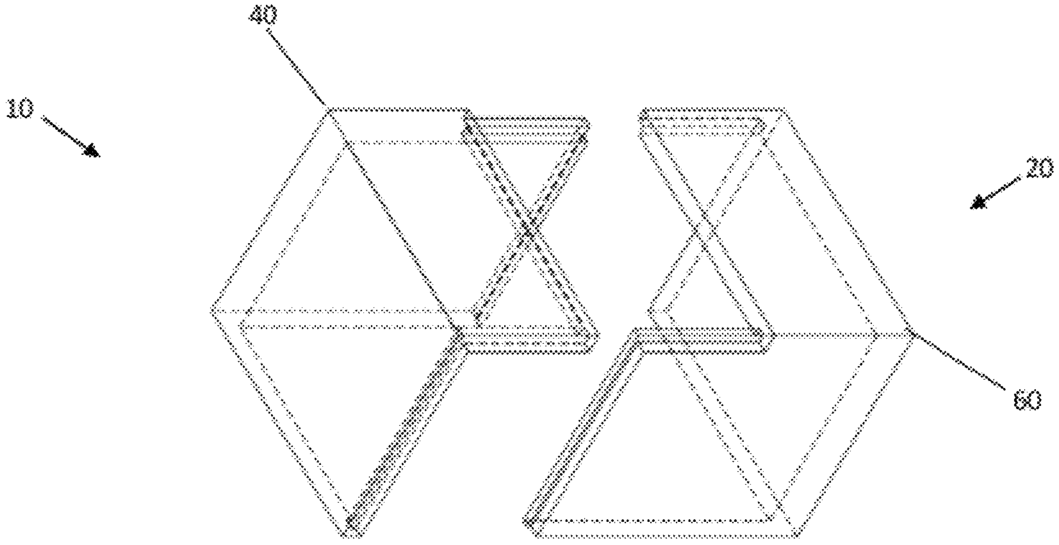
FIG. 37 depicts a transparent exploded top perspective view of FIG. 36.
Figure 38:
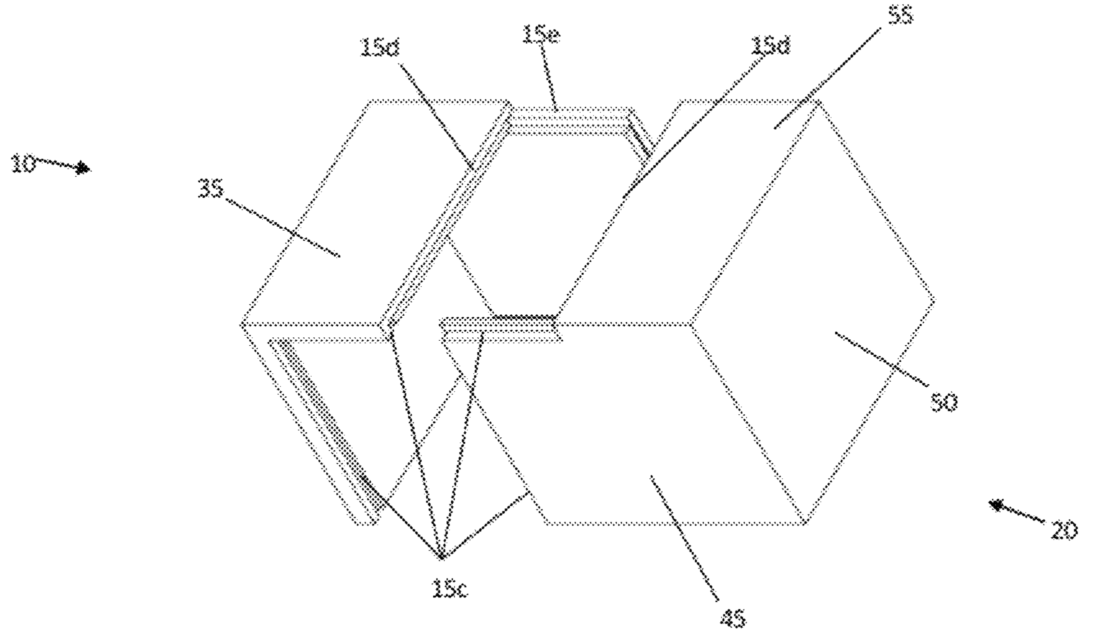
FIG. 38 depicts another exploded top perspective view of the embodiment of the cover device of the present invention from FIGS. 11-18.
Figure 39:
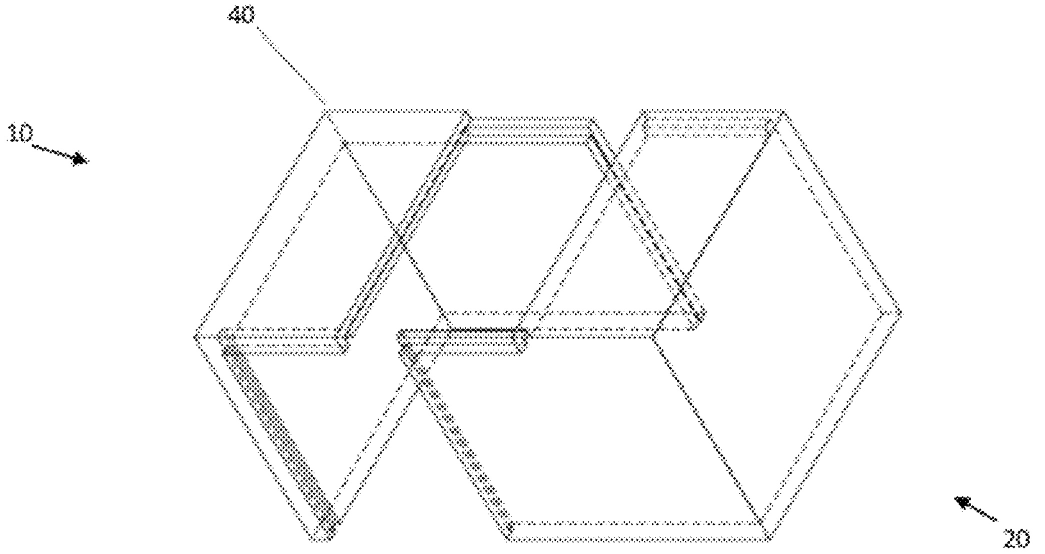
FIG. 39 depicts a transparent exploded top perspective view of FIG. 38.
Figure 40:
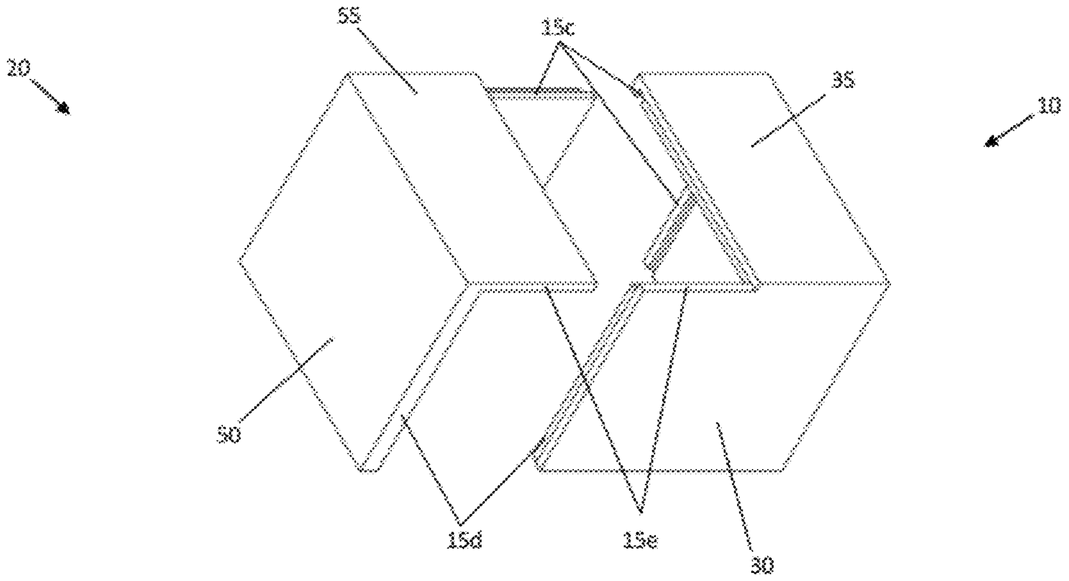
FIG. 40 depicts another exploded top perspective view of the embodiment of the cover device of the present invention from FIGS. 11-18.
Figure 41:
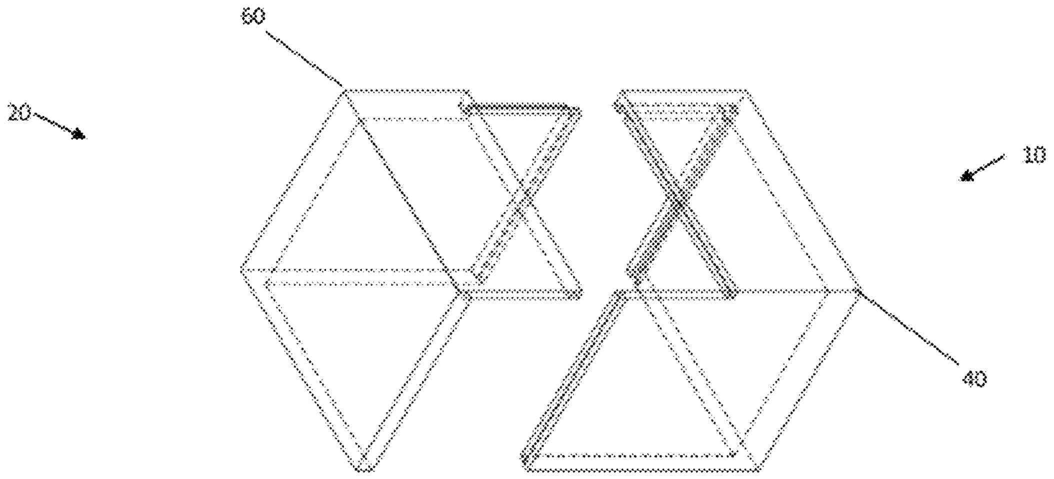
FIG. 41 depicts a transparent exploded top perspective view of FIG. 40.
Figure 42:
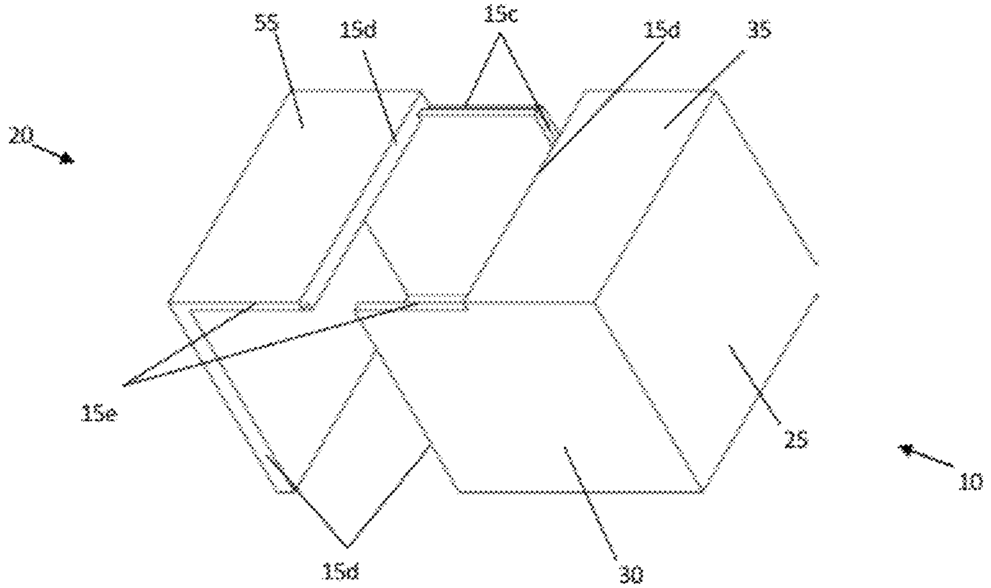
FIG. 42 depicts another exploded top perspective view of the embodiment of the cover device of the present invention from FIGS. 11-18.
Figure 43:
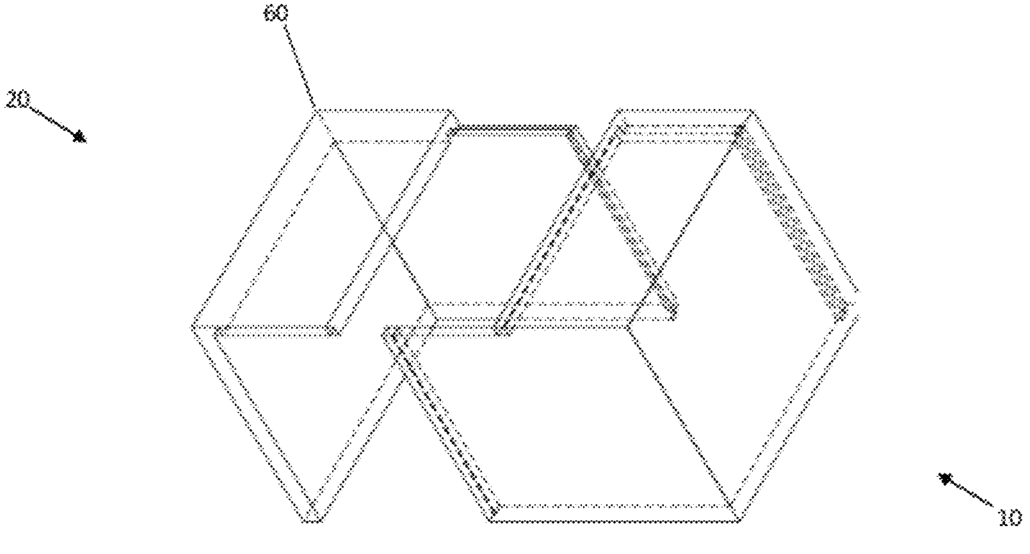
FIG. 43 depicts a transparent exploded top perspective view of FIG. 42.
Figure 44:
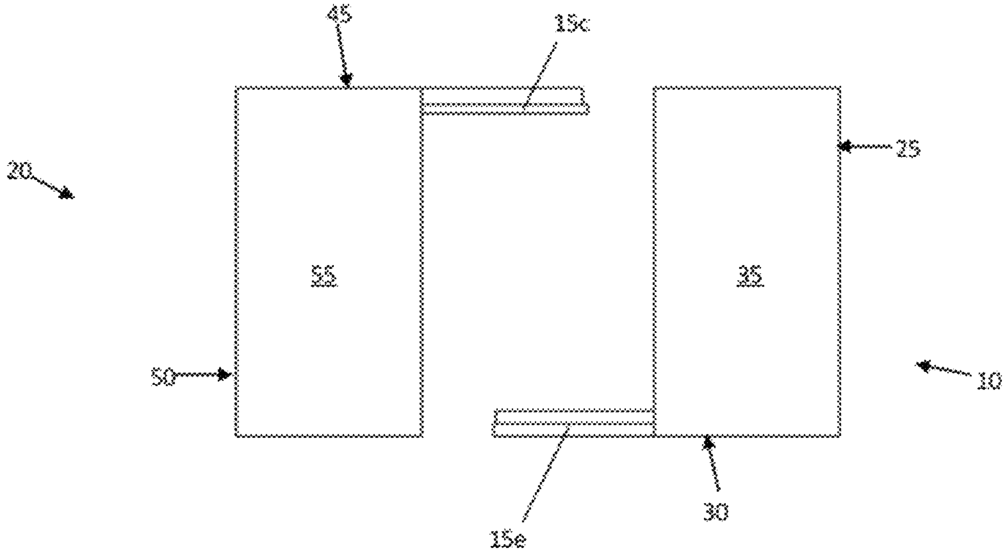
FIG. 44 depicts an exploded top view of the embodiment of the cover device of the present invention from FIGS. 11-18.
Figure 45:
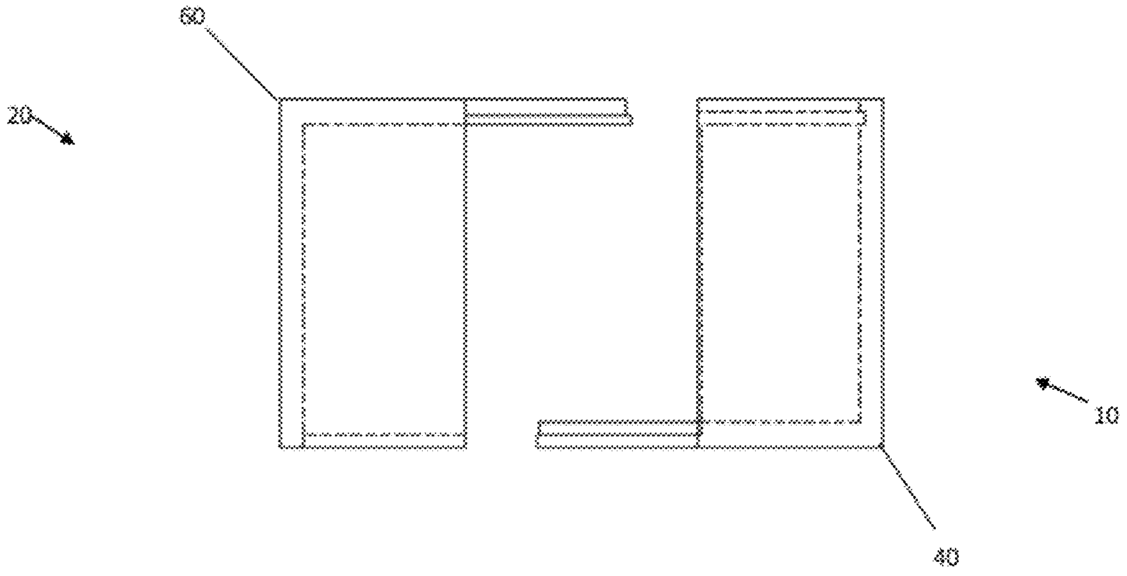
FIG. 45 depicts a transparent exploded top view of FIG. 44.

As best shown in FIG. 30, one or more edges on each of the front wall 45, the right wall 50, and/or the second top wall 55 or any combination thereof may further comprise a second connector 15*b* allowing for at least one complimentary connection 15 to be formed when and where the second component 20 is united and/or mated with the first component 10 (as shown in FIGS. 39-45). Such second connectors 15*b* may include but are not limited to structures capable of comprising a portion of a tongue and groove joint, a step joint, a dovetail joint, a box joint, a mortise and tenon joint, a dado joint, a dowel butt joint, a butt joint, a lap joint, a halving joint, hook and loop fasteners, snap fasteners, and any other connectors known within the art. In preferred embodiments, the second connectors 15*b* may include but are not limited to structures comprising a portion of a tongue and groove joint, a step joint, and a butt joint. In a preferred embodiment and as shown in FIGS. 27-35, at least one edge of the front wall 45 may comprise a second connector 15*b* in the form of a tongue and groove joint element 15*c*, at least one edge of the right wall 50 may comprise a second connector 15*b* in the form of a butt joint element 15*d*, and at least one edge of the second top wall 55 may comprise a second connector 15*b* in the form of a butt joint element 15*d* and at least one edge of the second top wall 55 may comprise a second connector 15*b* in the form of a step joint element 15*e*. The scope of the present invention is not so narrowly limited however and the scope of the present invention includes substitutions for the second connector 15*b* with any and all connectors and/or joint elements known within the art.

In use, as was described for the first embodiment, devices 100 of the present invention may be shipped and/or stored as separate first components 10 and second components 20. When ready for use and installation and as shown in FIGS. 11-18, the first component 10 and second component 20 may be married and/or united along at least one complimentary connection 15 in the form of one or more first connectors 15*a* on the first component 10 and one or more second connectors 15*b* on the second component 20 (see FIGS. 36-45). When the cover device 100 is assembled in a right-angled parallelepiped shape configuration as shown in FIGS. 11-18, the device 100 may comprise an open bottom face 65. The cover device 100 may be placed over a recessed light fixture (or any other fixture) with the fixture passing through the open bottom face 65 of the assembled cover device 100 with the cover device 100 then being secured and/or sealed to the dry wall, sheet rock, or other surface supporting the fixture by foam or any other manner known within the art.

Figure 46:
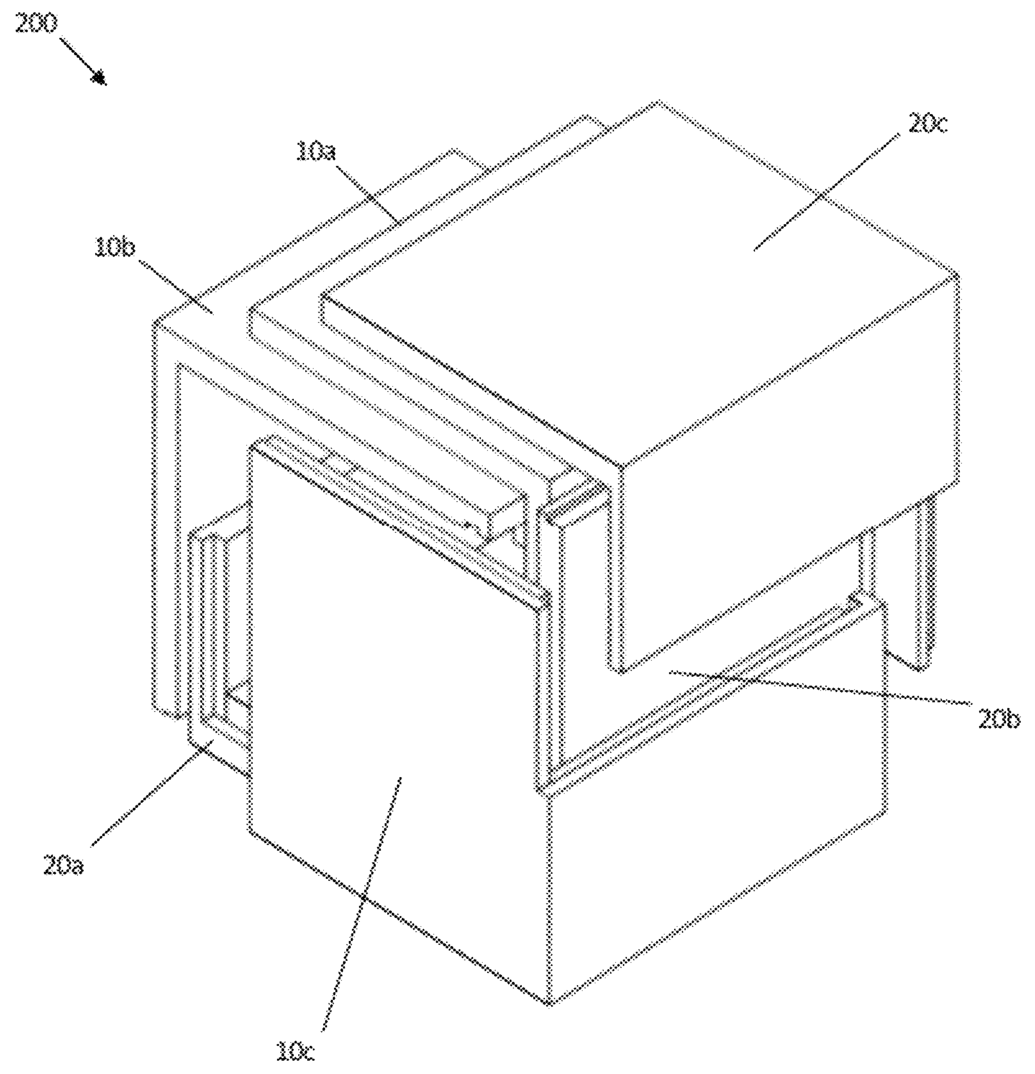
FIG. 46 depicts a top perspective view of an embodiment of storage unit comprising of a plurality of cover devices of the present invention.

As shown in FIG. 46, a plurality of first components 10 and second components 20 may be closely packed and configured to comprise a storage unit 200 that is both space-efficient and economical. The storage unit 200 depicted in FIG. 46 comprises three first components 10*a*/10*b*/10*c* and three second components 20*a*/20*b*/20*c* that may be arranged to fit the disassembled components of three cover devices 100 of the present invention into the approximate volume occupied by one assembled cover device 100 of the present invention.

Figure 47:
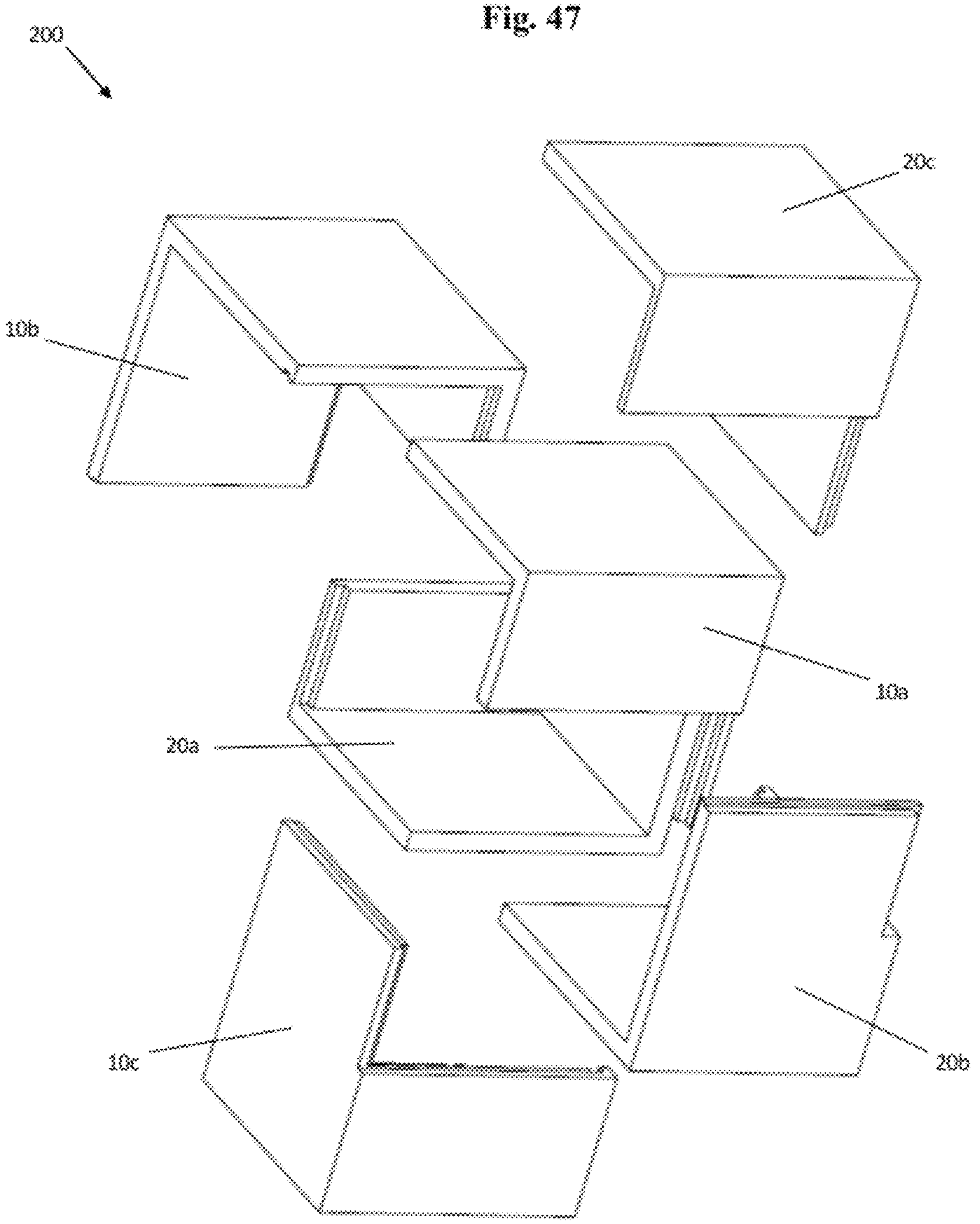
FIG. 47 depicts an exploded top perspective view of the embodiment of the storage unit configuration from FIG. 46.
Figure 48:
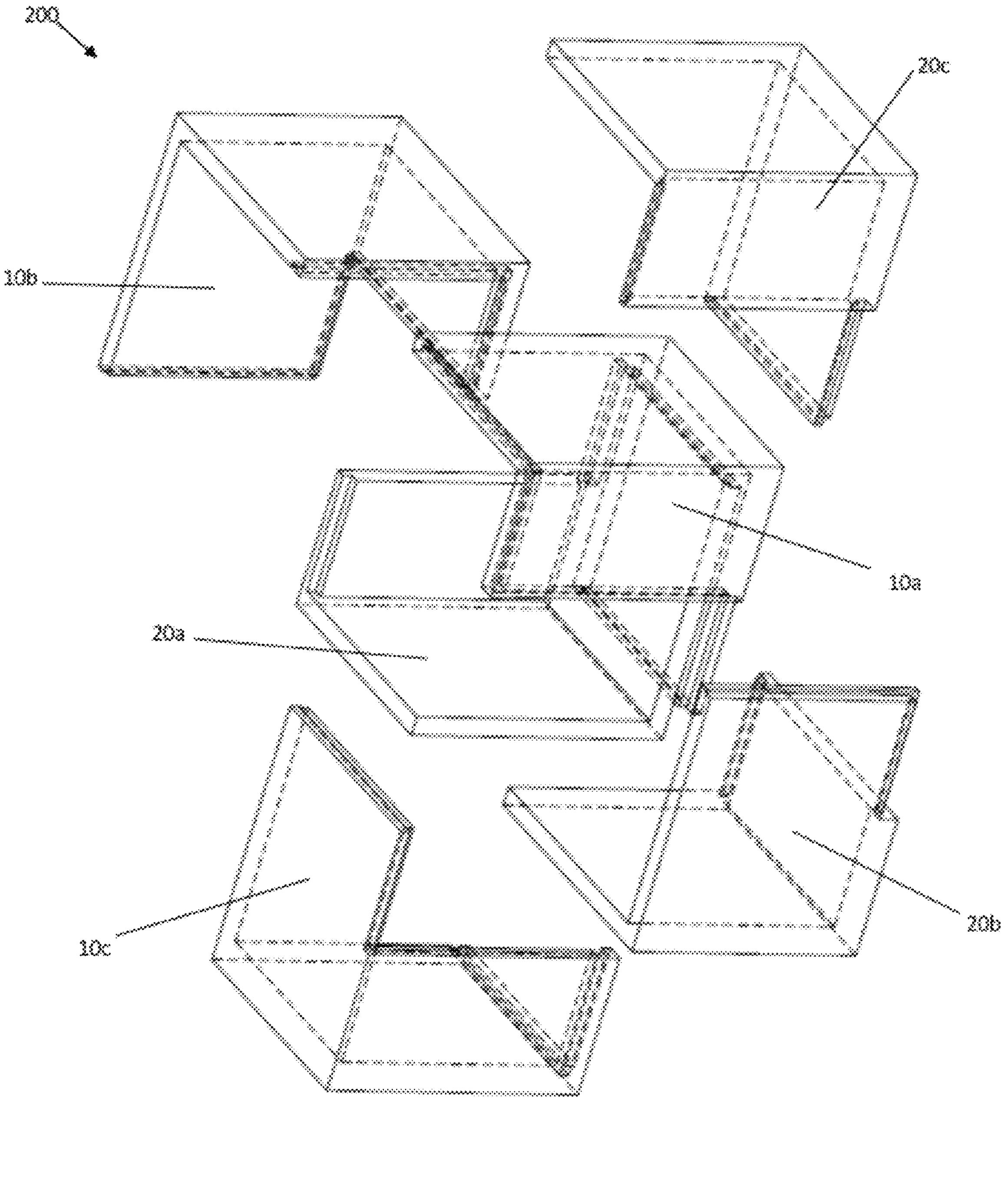
FIG. 48 depicts a transparent exploded top perspective view of FIG. 47.
Figure 49:
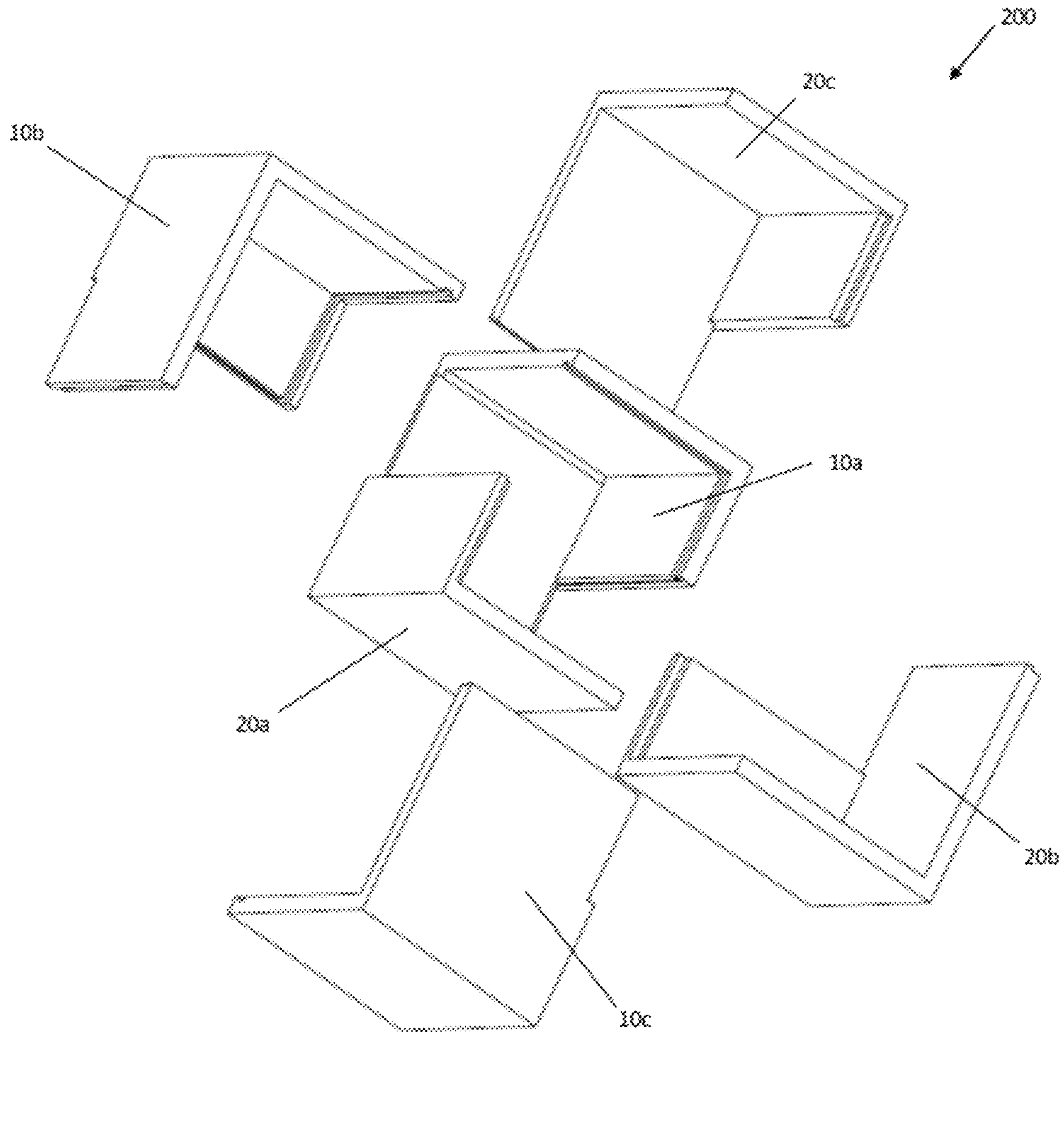
FIG. 49 depicts an exploded bottom perspective view of the embodiment of the storage unit configuration from FIG. 46.
Figure 50:
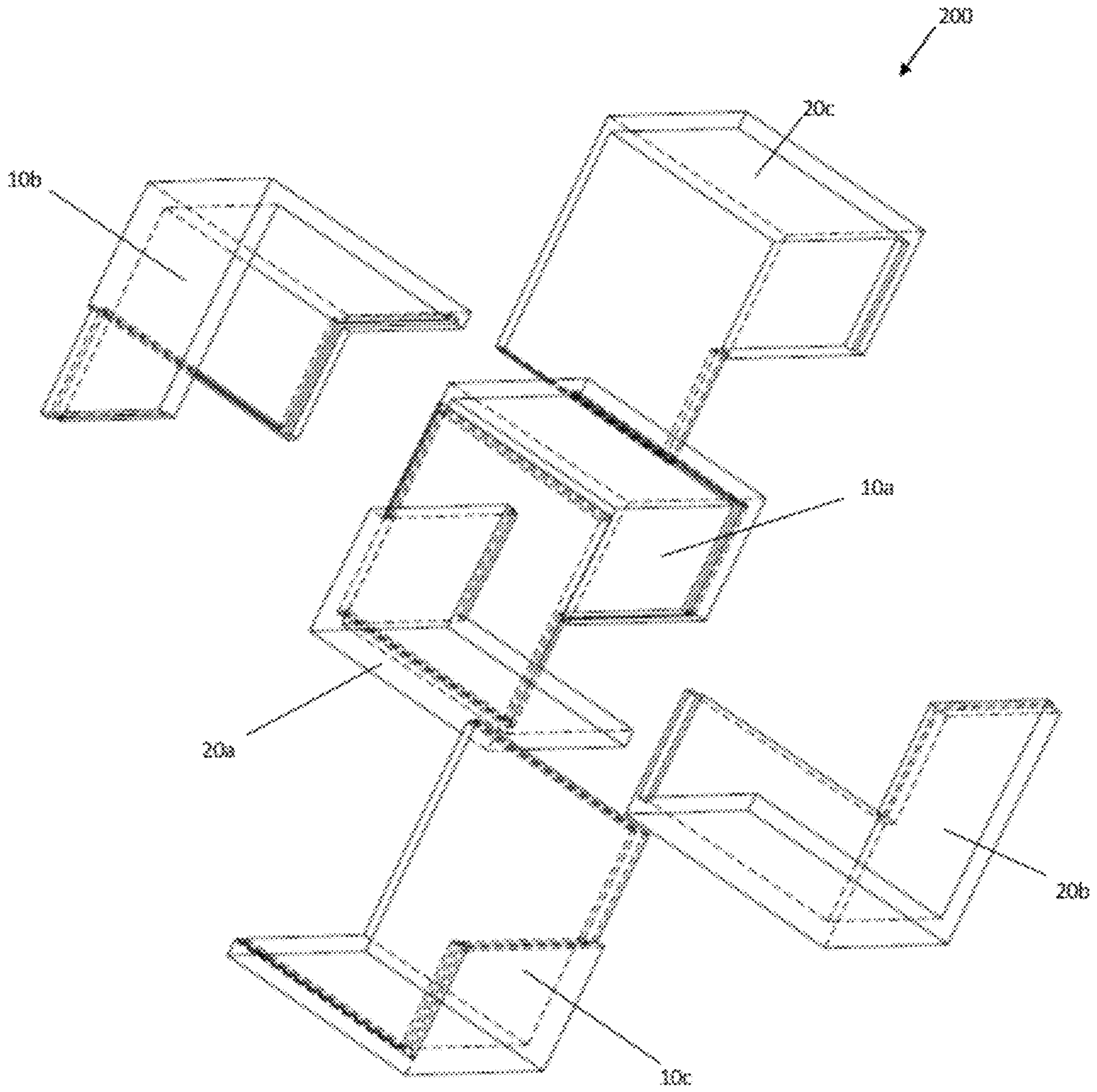
FIG. 50 depicts a transparent exploded bottom perspective view of FIG. 49.

FIGS. 47-50 depict exploded views of the storage unit 200 stacking configuration of the first components 10*a*/10*b*/10*c* and the second components 20*a*/20*b*/20*c*, wherein FIGS. 48 and 50 provide transparent views of the exploded perspective views shown in FIGS. 47 and 49, respectively. Comparing the storage unit 200 as depicted in FIG. 46 to the exploded view provided in FIGS. 47-50 provides an essential blueprint on how a plurality of first components 10*a*/10*b*/10*c* and a plurality of second components 20*a*/20*b*/20*c* may be spatially arranged to uniquely improve the volumetric stacking efficiently of disassembled cover device 100 components when a plurality of cover devices 100 are stored or transported. As depicted in FIGS. 46-50, an inner first component 10*a* and an inner second component 20*a* may first be spatially arranged to provide the central core of the storage unit 200. Next an intermediate first component 10*b* and an intermediate second component 20*b* may then be arranged about the inner components 10*a*/20*a* to provide the storage unit 200 with an intermediate packing layer about the central core. Finally, an outer first component 10*c* and an outer second component 20*c* may then be arranged about the intermediate components 10*b*/20*b* to provide the storage unit 200 with an outer packing layer about both the central core and the intermediate layer, as shown in FIG. 46. The shape and configuration of the first components 10 and second components 20, particularly those shown in FIGS. 19-45, provides for an improvement in stacking and storage efficiency for any like shaped cover devices 100.

Figure 51:
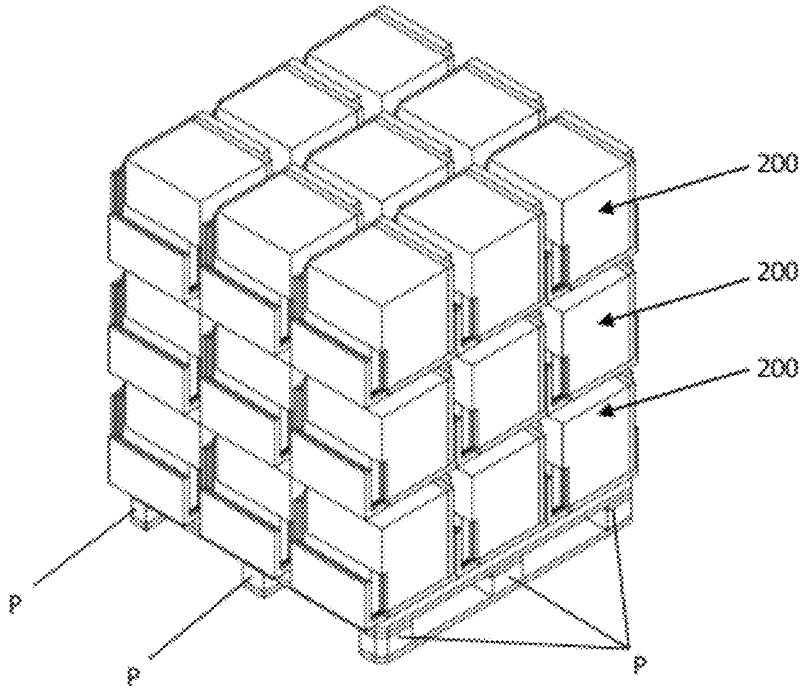
FIG. 51 depicts a top perspective view of an embodiment of a plurality of storage units of cover devices of the present invention from FIG. 46 configured on a pallet.
Figure 52:
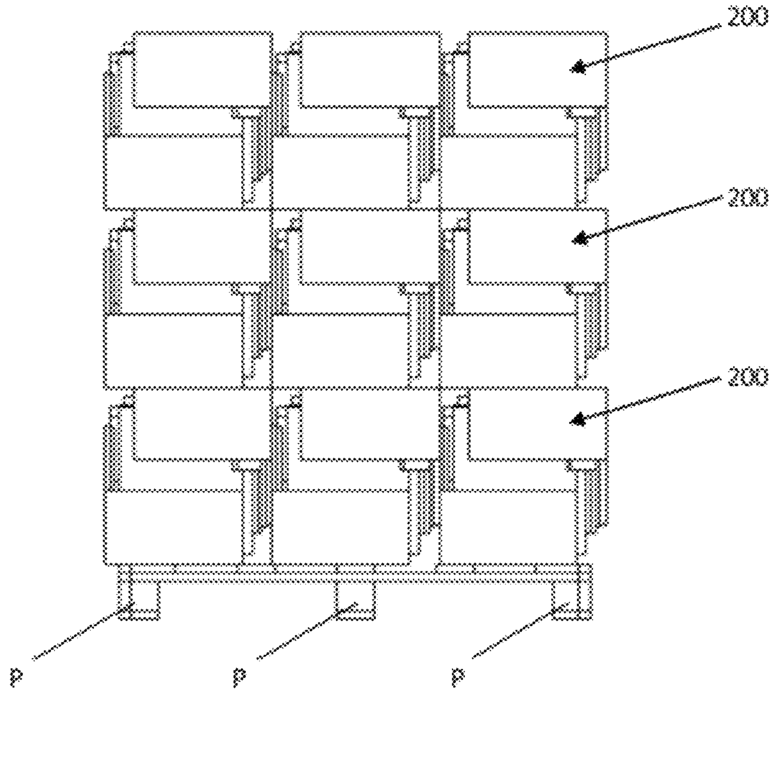
FIG. 52 depicts a side view of an embodiment of a plurality of storage units of cover devices of the present invention from FIG. 46 configured on a pallet.

Further still, FIGS. 51-52 depict a preferred embodiment wherein a plurality of storage units 200 may be disposed on a palette P for shipping and/or storage. The efficient and economical use of space as shown in each storage unit 200 in FIGS. 46-50 provides a very beneficial advantage to wholesalers, retailers, contractors, and other end users by dramatically reducing transportation and storage costs associated with cover devices 100 of the present invention.

Cover devices 100 of the present invention and their plurality of components may be constructed from a wide range of materials. Any materials having beneficial characteristics and properties such as providing varying levels of fire resistance, providing varying levels of thermal insulation value, providing air proofing or resistance to air infiltration, providing a moisture barrier, providing an insect barrier, and the like may be used. Exemplary materials may include any materials known within the art including but not limited to polypropylene foam including expanded polypropylene foam (EPP), polyurethane foam, polyethylene foam (such as that market under the trade name Ethafoam® by The Dow Chemical Company), polystyrene foams, extruded polystyrene, expanded polystyrene, corrugated plastic sheeting, PVC sheeting, corrugated fiberboard, fire rated sheeting, aluminum sheeting and the like, dry wall or wallboard (e.g. sheet rock, plywood, asbestos cement sheets, gypsum plasterboard, laminated plastics, and the like), mineral wool material, intumescent material, flame retarded ABS material, and the like. In a more preferred embodiment, may include but are not limited to polypropylene foam including expanded polypropylene foam (EPP), polyurethane foam, polyethylene foam (such as that market under the trade name Ethafoam® by The Dow Chemical Company), polystyrene foams, extruded polystyrene, expanded polystyrene, and the like.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A recessed light fixture cover device, comprising:

a first component and a second component, wherein each of said first component and said second component comprises at least one complimentary connection between said first component and said second component, said device is capable of being transported in a disassembled state and then assembled for use when said at least one complimentary connection between said first component and said second component is united;

wherein each of said first component and said second component is independently fabricated from a thermally insulative material selected from the group consisting of polypropylene foam, expanded polypropylene foam, polyurethane foam, polyethylene foam, polystyrene foams, extruded polystyrene, expanded polystyrene, corrugated plastic sheeting, PVC sheeting, corrugated fiberboard, fire rated sheeting, dry wall or wallboard (e.g. sheet rock, plywood, asbestos cement sheets, gypsum plasterboard, laminated plastics, and the like), mineral wool material, intumescent material, and flame retarded ABS material;

wherein each of said at least one complimentary connections is independently selected from the group consisting of a tongue and groove joint, a step joint, a dovetail joint, a box joint, a mortise and tenon joint, a dado joint, a dowel butt joint, a butt joint, a halving joint, hook and loop fasteners, a lap joint, and snap fasteners;

wherein said first component and said second components each respectively comprise three walls;

wherein said first component comprises a left wall, a rear wall disposed perpendicular to said left wall, and a first top wall disposed perpendicular to both said left wall and said rear wall;

wherein said junction of said left wall, said rear wall, and said first top wall forms a three dimensional first component right angle corner;

wherein said second component comprises a right wall, a front wall disposed perpendicular to said right wall, and a second top wall disposed perpendicular to both said right wall and said front wall;

wherein said junction of said right wall, said front wall, and said second top wall forms a three dimensional second component right angle corner; and wherein said at least one complimentary connection is disposed between said front wall and said left wall, between said front wall and said first top wall, between said rear wall and said right wall, between said rear wall and said second top wall, and between said first top wall and said second top wall.

2. The recessed fixture cover device of claim 1, wherein said at least one complimentary connection disposed between said front wall and said left wall comprises a tongue and groove joint and said at least one complimentary connection disposed between said front wall and said first top wall also comprises a tongue and groove joint.

3. The recessed fixture cover device of claim 1, wherein said at least one complimentary connection disposed between said rear wall and said second top wall comprises a step joint, a lap joint, or a halving joint.

4. The recessed fixture cover device of claim 1, wherein said at least one complimentary connection disposed between said rear wall and said right wall comprises a butt joint and said at least one complimentary connection disposed between said first top wall and said second top wall also comprises a butt joint.

5. The recessed fixture cover device of claim 1, wherein three of said first components and three of said second components are capable of being tightly stacked together forming a storage unit, wherein one or more storage units are capable of being economically transported and/or stored.

6. The recessed fixture cover device of claim 2, wherein three of said first components and three of said second components are capable of being tightly stacked together forming a storage unit, wherein one or more storage units are capable of being economically transported and/or stored.

7. The recessed fixture cover device of claim 3, wherein three of said first components and three of said second components are capable of being tightly stacked together forming a storage unit, wherein one or more storage units are capable of being economically transported and/or stored.

8. The recessed fixture cover device of claim 4, wherein three of said first components and three of said second components are capable of being tightly stacked together forming a storage unit, wherein one or more storage units are capable of being economically transported and/or stored.

* * * * *